US012610945B2

(12) United States Patent
Sumerlin et al.

(10) Patent No.: US 12,610,945 B2
(45) Date of Patent: *Apr. 28, 2026

(54) STIMULI-RESPONSIVE POLYMERIC NANOPARTICLES, METHODS OF MAKING STIMULI-RESPONSIVE POLYMERIC NANOPARTICLES, AND METHODS OF USING STIMULI-RESPONSIVE POLYMERIC NANOPARTICLES

(71) Applicant: University of Florida Research Foundation, Inc., Gainesville, FL (US)

(72) Inventors: Brent S. Sumerlin, Gainesville, FL (US); Shaun Paul Jensen, Gainesville, FL (US); Megan R. Hill, Gainesville, FL (US); Mingsheng Chen, Gainesville, FL (US); Gloria A. Moore, Gainesville, FL (US); Zhenli L He, Gainesville, FL (US); Sangwoo Park, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 453 days.

This patent is subject to a terminal disclaimer.

(21) Appl. No.: 17/979,857

(22) Filed: Nov. 3, 2022

(65) Prior Publication Data

US 2023/0200382 A1     Jun. 29, 2023

Related U.S. Application Data

(63) Continuation of application No. 16/066,926, filed as application No. PCT/US2016/069200 on Dec. 29, 2016, now Pat. No. 11,627,738.

(60) Provisional application No. 62/275,441, filed on Jan. 6, 2016.

(51) Int. Cl.
*A01N 25/28*     (2006.01)
*A01N 25/10*     (2006.01)
*C05G 5/30*     (2020.01)

(52) U.S. Cl.
CPC .............. *A01N 25/28* (2013.01); *A01N 25/10* (2013.01); *C05G 5/37* (2020.02)

(58) Field of Classification Search
None
See application file for complete search history.

(56) References Cited

U.S. PATENT DOCUMENTS

| | | |
|---|---|---|
| 6,638,994 B2 | 10/2003 | Crooks et al. |
| 8,598,081 B2 | 12/2013 | Jongedijk et al. |
| 2004/0249114 A1* | 12/2004 | Swift ..................... C08L 79/08 |
| | | 528/310 |

| | | |
|---|---|---|
| 2010/0029545 A1 | 2/2010 | Sumerlin |
| 2012/0244205 A1 | 9/2012 | Treseder et al. |
| 2015/0033418 A1 | 1/2015 | Lommel et al. |

FOREIGN PATENT DOCUMENTS

| | | | |
|---|---|---|---|
| CA | 2835637 A1 | 11/2012 | |
| CN | 101838375 | 12/2012 | |
| JP | 2007246423 A * | 9/2007 | |
| WO | 90/11778 | 10/1990 | |
| WO | 2010039865 A2 | 4/2010 | |
| WO | 2010/091465 | 8/2010 | |
| WO | 2012/156058 | 11/2012 | |
| WO | WO-2012156058 A1 * | 11/2012 | ............ C08F 230/04 |

OTHER PUBLICATIONS

Xu et al. (Journal of Macromolecular vol. A40 No. 5, pp. 511-523, (2003) (Year: 2003).*
Hill, M. R., MacKrell, E. J., Forsthoefel, C. P., Jensen, S. P., Chen, M., Moore, G. A., . . . & Sumerlin, B. S. (2015). Biodegradable and pH-responsive nanoparticles designed for site-specific delivery in agriculture. Biomacromolecules, 16(4), 1276-1282. (Year: 2015).*
Chen, M., Jensen, S. P., Hill, M. R., Moore, G., He, Z., & Sumerlin, B. S. (2015). Synthesis of amphiphilic polysuccinimide star copolymers for responsive delivery in plants. Chemical Communications, 51(47), 9694-9697. (Year: 2015).*
Gao, W.; Chan, J. M.; Farokhzad, O. C.; pH-Responsive Nanoparticles for Drug Delivery; Molecular Pharmaceutics 2010, 7, pp. 1913-1920.
J. R. McDaniel, et al.; Drug delivery to solid tumors by elastin-like polypeptides; Adv. Drug. Deliver. Rev., 2010, 62, pp. 1456-1467.
Puoci, F., et al; Polymer in Agriculture: A review; N. American Journal of Agricultural and Biological Sciences 2008, 3, pp. 299-314.
P. Gonzalez-Melendi, R. Fernandez-Pacheco, M. J. Coronado, E. Corredor, p. S. Testillano, M.C. Risueno, C. Marquina, M. R. Ibarra, D. Rubiales, & A. Perez-de-Luque; Nanoparticles as Smart Treatment-Delivery Systems in Plants: Assessment of Different Techniques of Microscopy for Their Visualization in Plant Tissues, Annals of Botany, vol. 101, Issue 1, Jan. 2008, pp. 187-195.
Baligar, V. C. et al.; Nutrient Use Efficiency in Plants; Communications in Soil Science and Plant Analysis, 2001, 32, pp. 921-950.
M. Lakshmanan, et al.; Rapid and Efficient Gene Delivery into Plant Cells Using Designed Peptide Carriers; Biomacromolecules, 2013, 14, pp. 10-16.
Bhattacharyya, A. et al.; Nano-particles—A recent approach to insect pest control; African Journal of Biotechnology. 2010, vol. 9, pp. 3489-3493.
D. A. Gómez, et al.; Effect of 1-naphthaleneacetic acid on organic acid exudation by the roots of white lupin plants grown under phosphorus deficient conditions; Journal of Plant Physiology, 2014, 171, pp. 1354-1361.
Perez-de-Luque, A. et al; Nanotechnology for parasitic plant control; Pest Manag. Sci. 2009, 65, pp. 540-545.

(Continued)

*Primary Examiner* — Anna R Falkowitz

(74) *Attorney, Agent, or Firm* — Thomas | Horstemeyer LLP.

(57) ABSTRACT

Embodiments of the present disclosure provide for compositions including polymer particles, methods of making compositions, methods of using the composition, stimuli-responsive methods of delivering agents, and the like.

4 Claims, 29 Drawing Sheets

(56) References Cited

OTHER PUBLICATIONS

Thombre, S. M. et al; Synthesis and Biodegradability of Polyaspartic Acid: A Critical Review Macromol. Sci. A 2005, 42, pp. 1299-1315.

Deming, Timothy J.; Synthetic polypeptides for biomedical applications: ScienceDirect, Prog. Polym. Sci. 32 (2007), pp. 858-875.

Chen, Minghseng et al; Synthesis of Amphiphilic Polysuccinimide Star Copolymers for Responsive Drug Delivery in Plants, Chemical Communications, vol. 51, May 2015, pp. 9694-9697.

Hill, Megan R. et al.; Biodegradable and PH-Responsive Nanoparticles Designed for Site-Specific Delivery in Agriculture, Biomacromolecules, vol. 16, Issue 4, Mar. 2015, pp. 1276-1282.

Anisha Ratan, Star Creation for Plant Medication, Chemistry World, May 2015, 3 pages.

Serban F. Peteu, Florin Oancea, Oana A. Sicuia, Florica Constantinescu, & Sorina Dinu; Responsive Polymers for Crop Protection, Polymers, vol. 2, Aug. 2010, pp. 229-251.

Remya Nair, Saino Hanna Varghese, Baiju G. Nair, T. Maekawa, Y. Yoshida, D. Sakathi Kumar; Nanoparticulate Material Delivery to Plants, Plant Science, vol. 179, Issue 3, Sep. 2010, pp. 154-163.

Ru Cheng, Fenghua Meng, Chao Deng, Harm-Anton Klok, & Zhiyan Zhong: Dual and Multi-Stimuli Responsive Polymeric Nanoparticles for Programmed Site-Specific Drug Delivery, Biomaterials, vol. 34, Issue 14, May 2013, pp. 3647-3657.

Arnab De, Rituparna Bose, Ajeet Kumar, & Subho Mozumdar: Targeted Delivery of Pesticides Using Biodegradable Polymeric Nanoparticles, Springer Briefs in Molecular Science, 2014, pp. 1-111.

International Search Report and Written Opinion for application No. PCT/US16/69200, mailed Mar. 8, 2017.

Chen, Metal. Synthesis of amphiphilic polysuccinimide star copolymers for responsive delivery in plants. Chemical Communication. May 15, 2015; title; 6 pages.

* cited by examiner

Figures 1.1, 1.2:
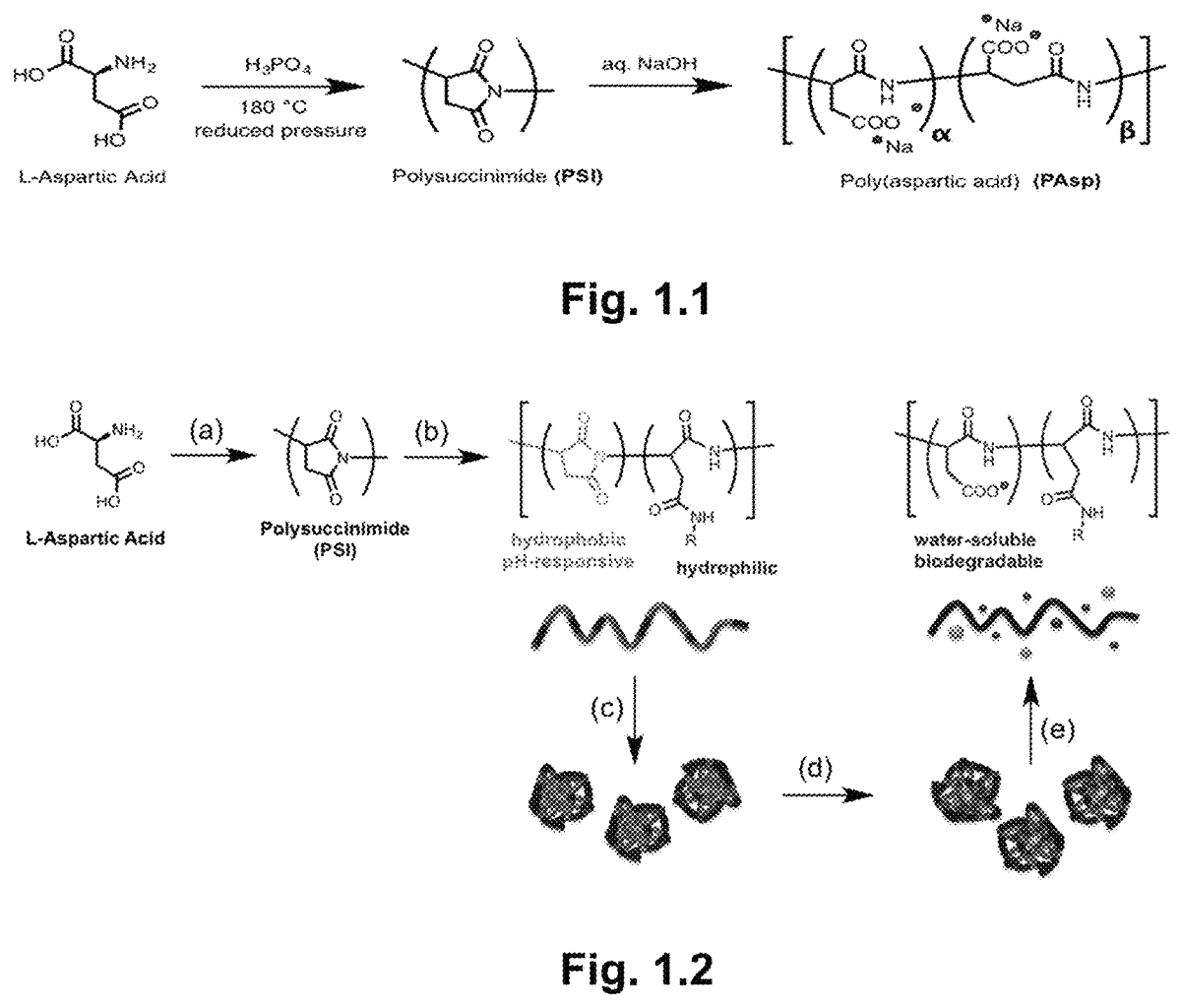

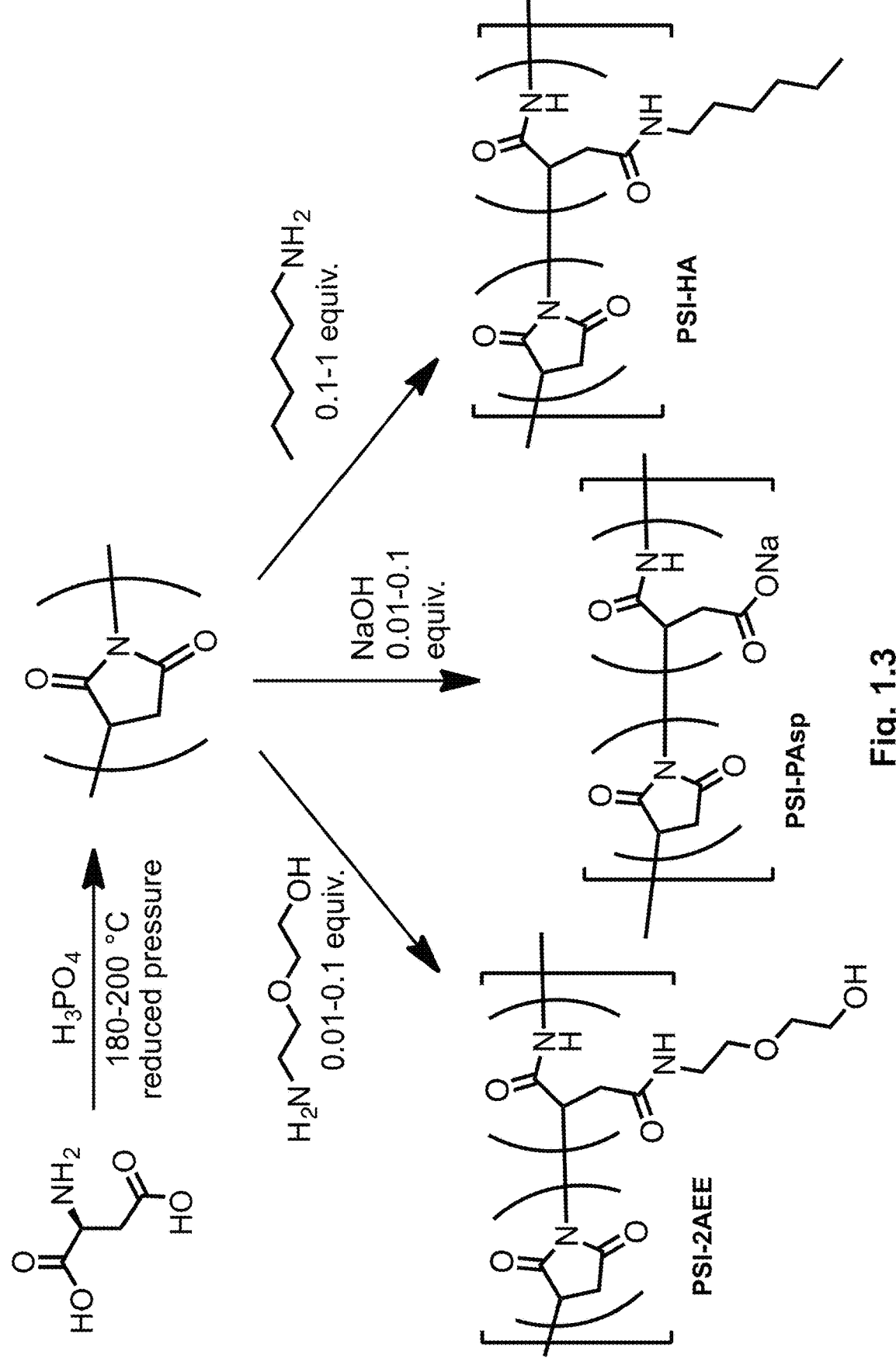
Fig. 1.3

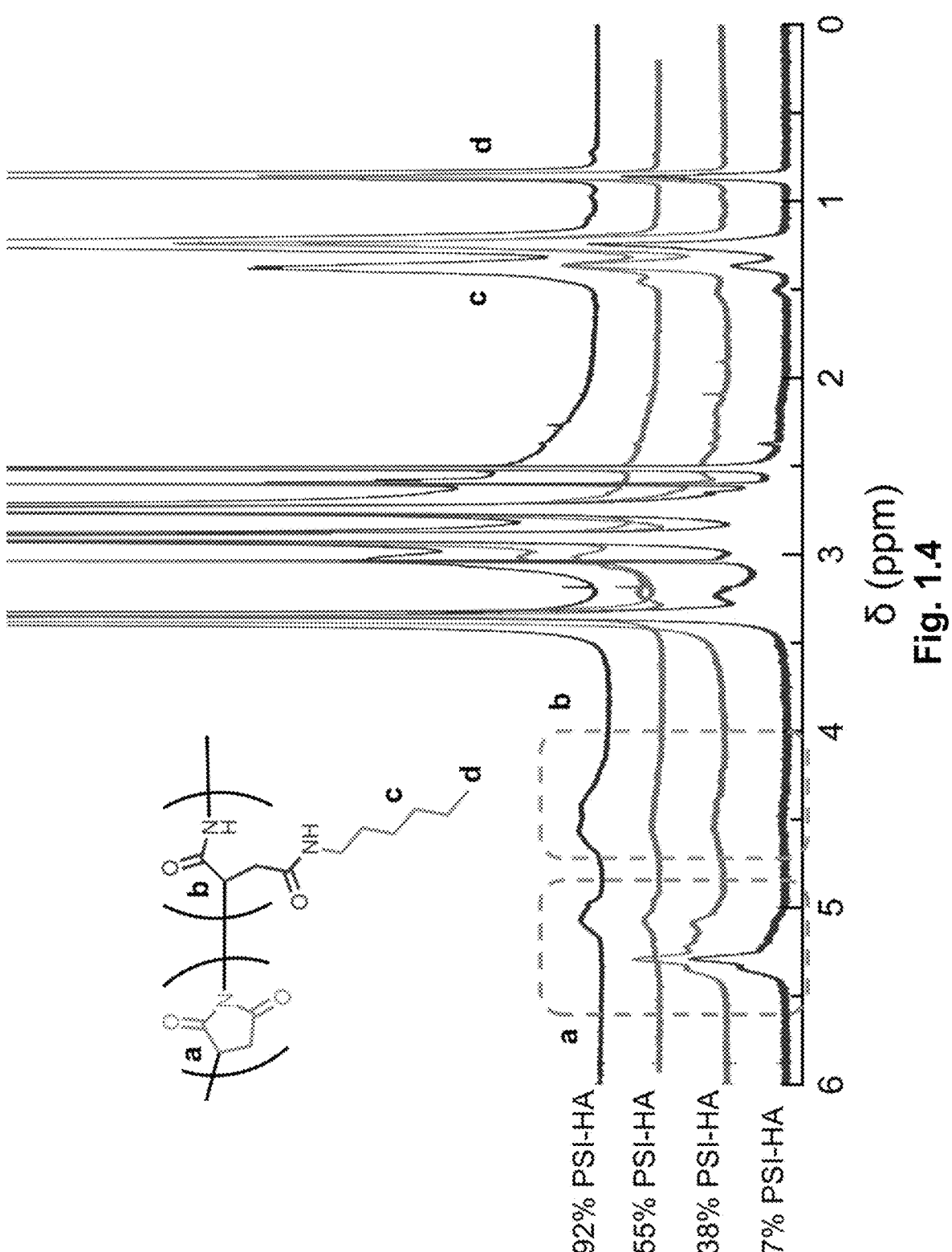
Fig. 1.4

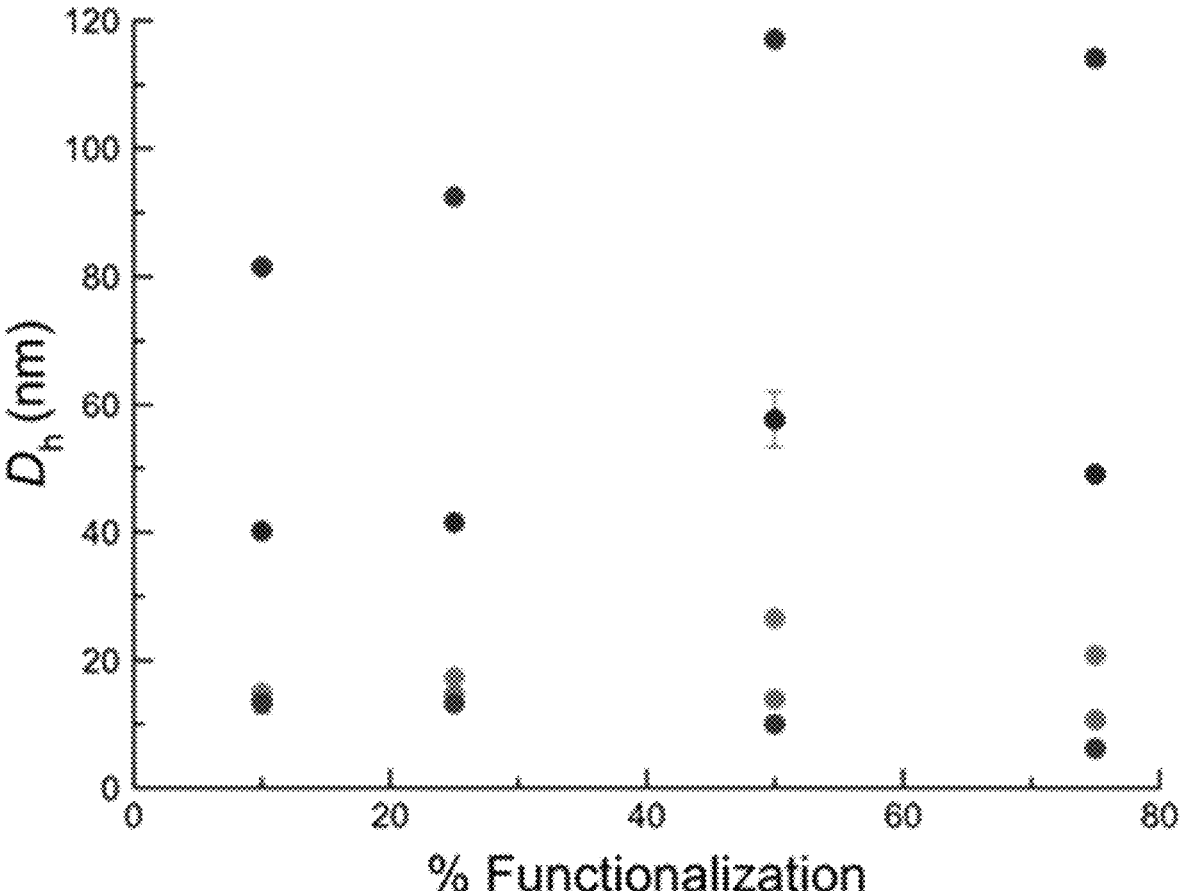
( •100 mg/mL, •50 mg/mL, • 20 mg/mL, •10 mg/mL, and •5 mg/mL)
Fig. 1.5

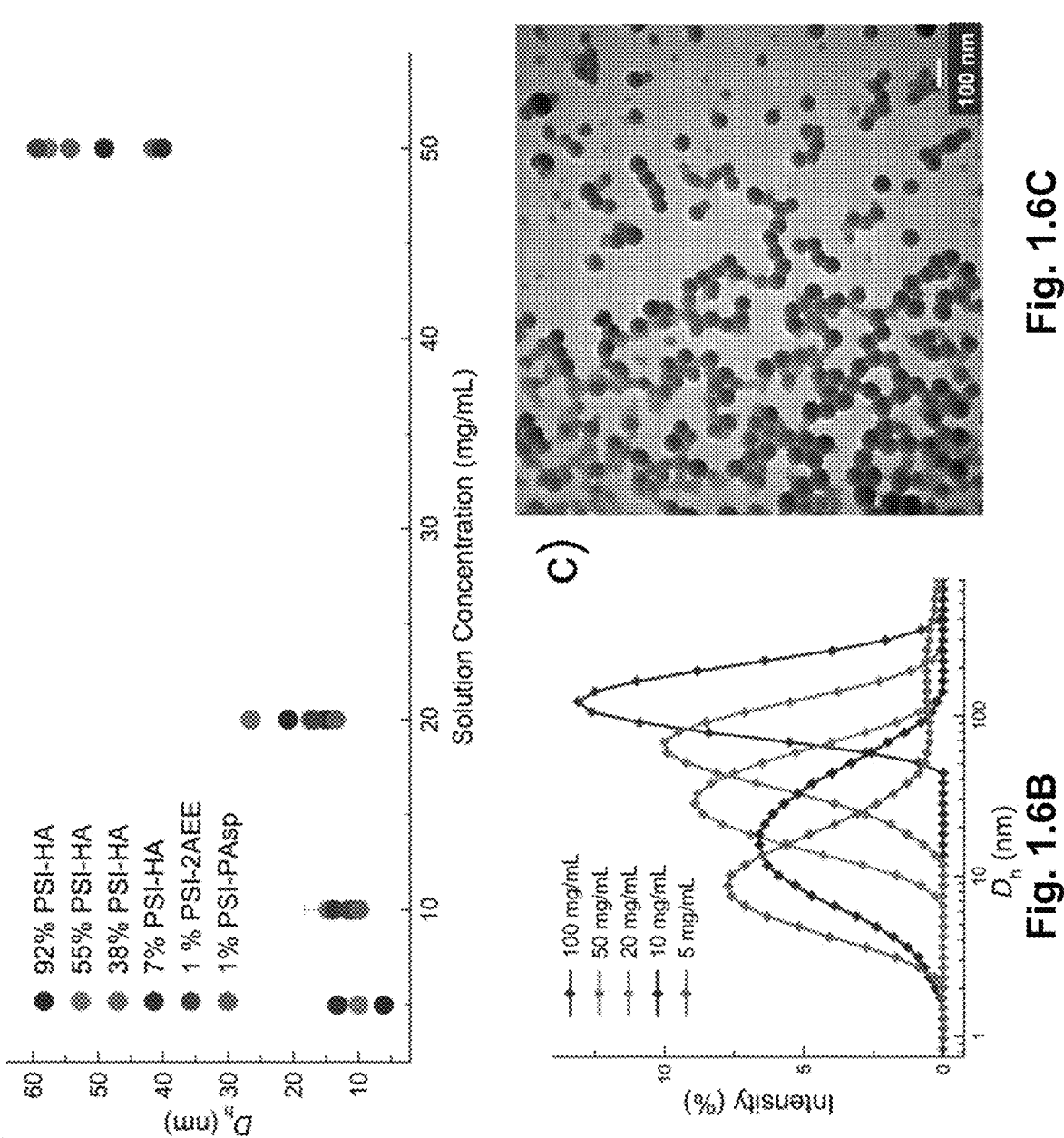
Fig. 1.6A
Fig. 1.6B
Fig. 1.6C

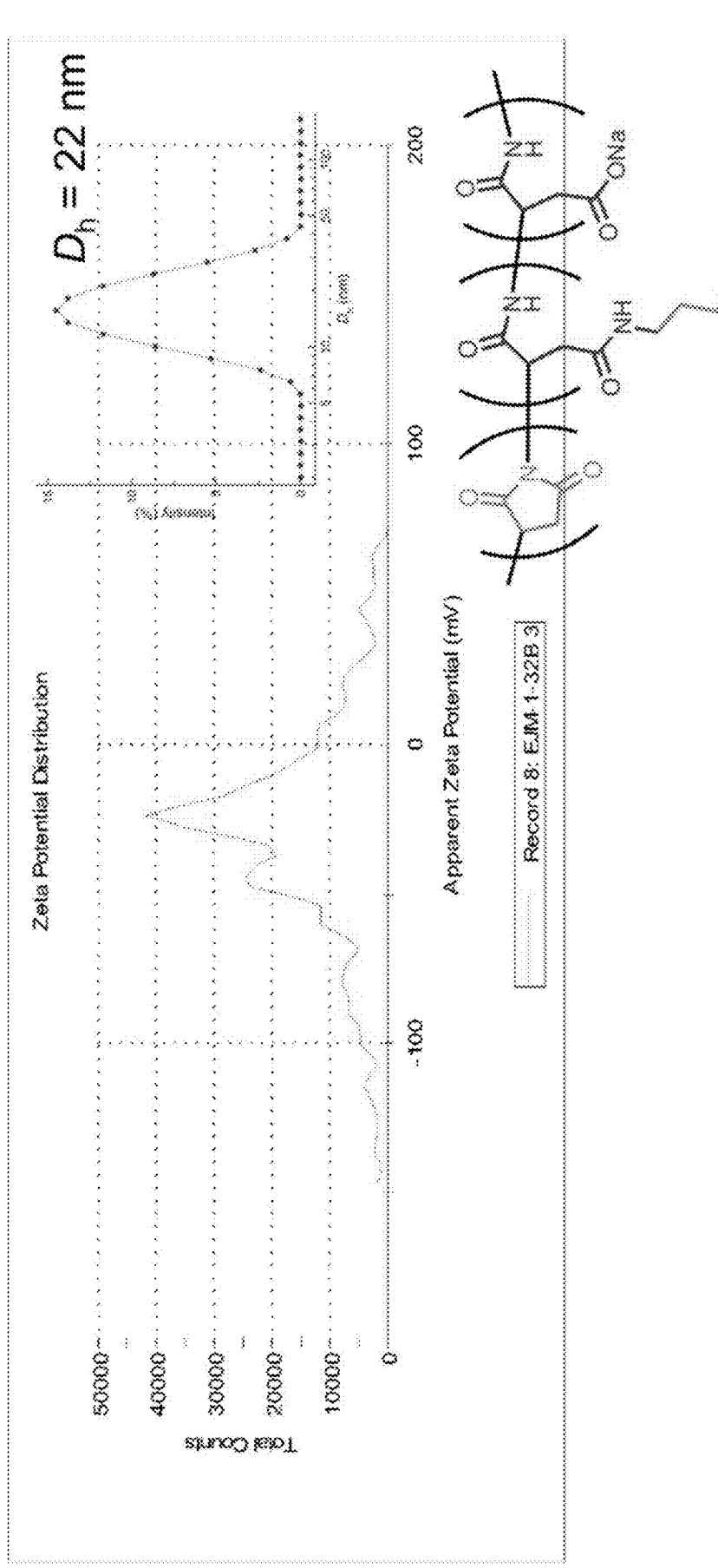
Fig. 1.7

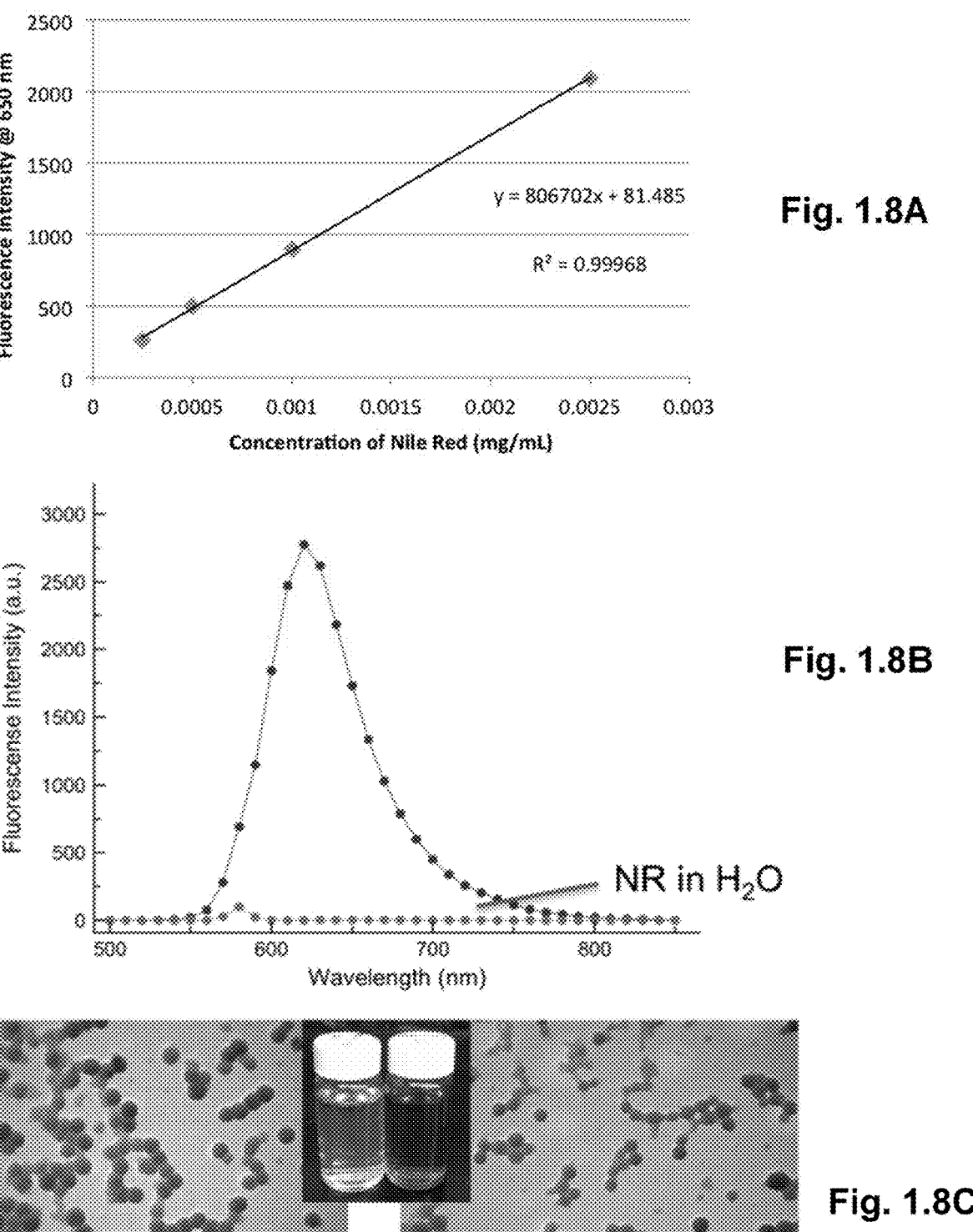
Fig. 1.8A
Fig. 1.8B
Fig. 1.8C

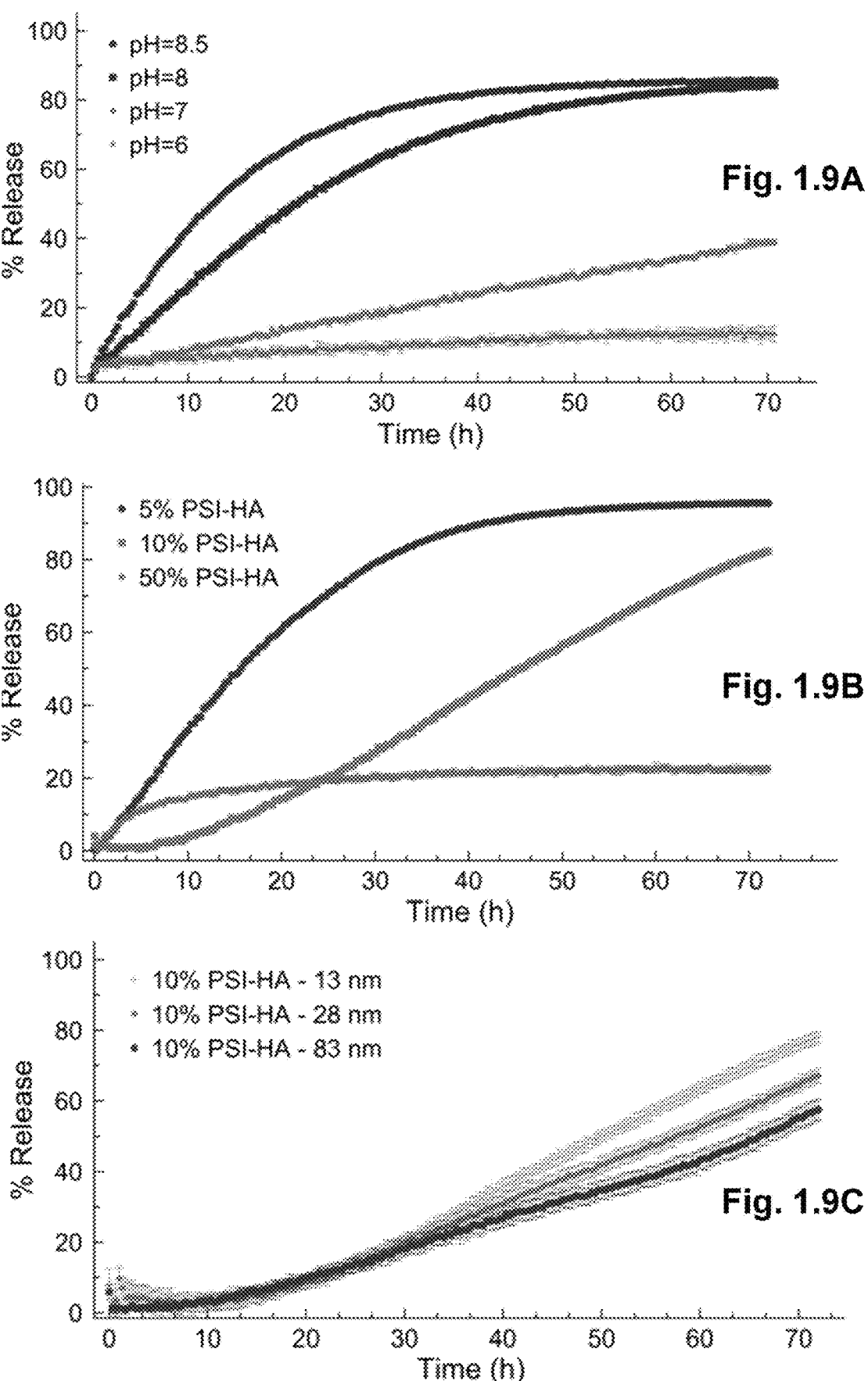
Fig. 1.9A
Fig. 1.9B
Fig. 1.9C

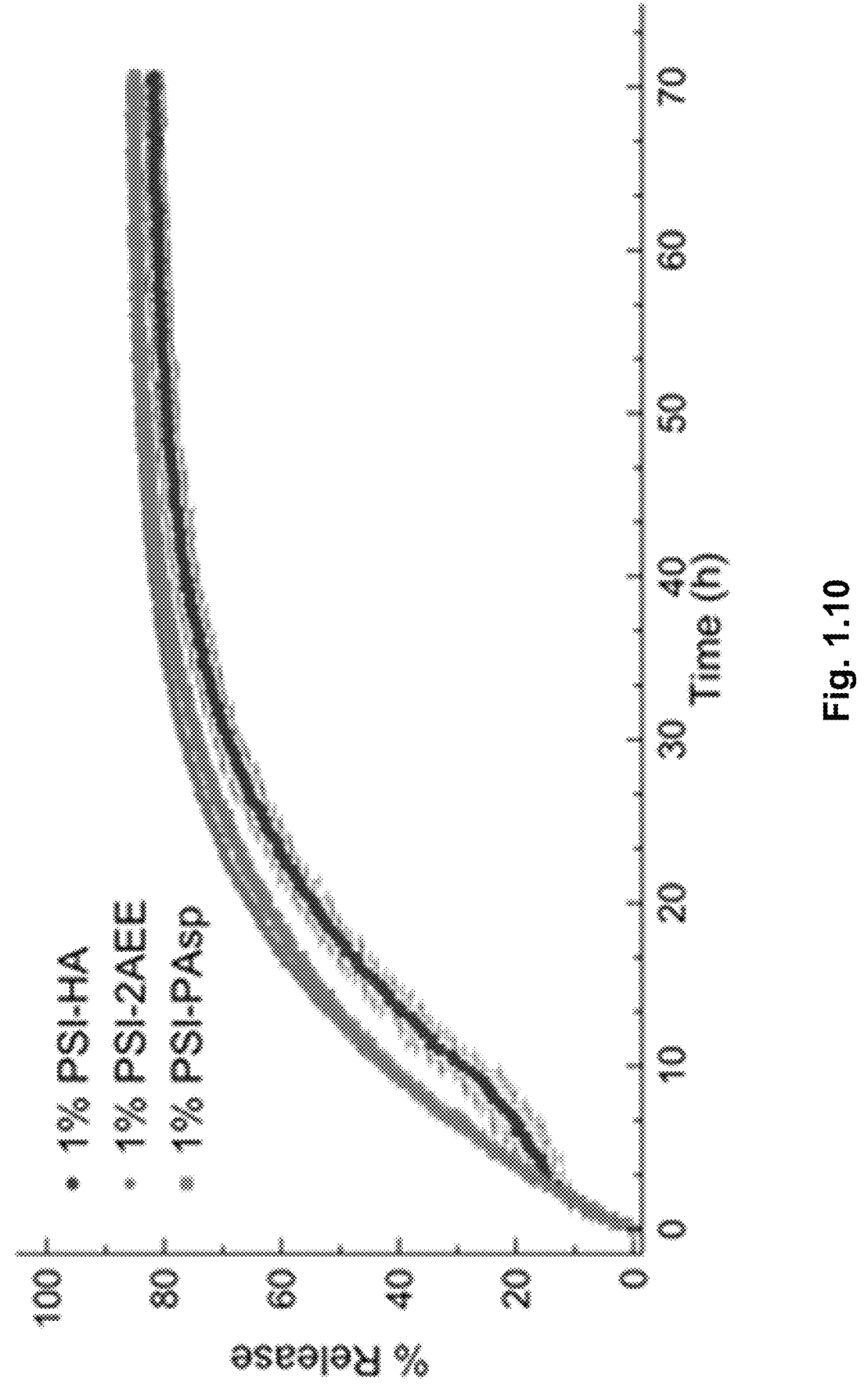
Fig. 1.10

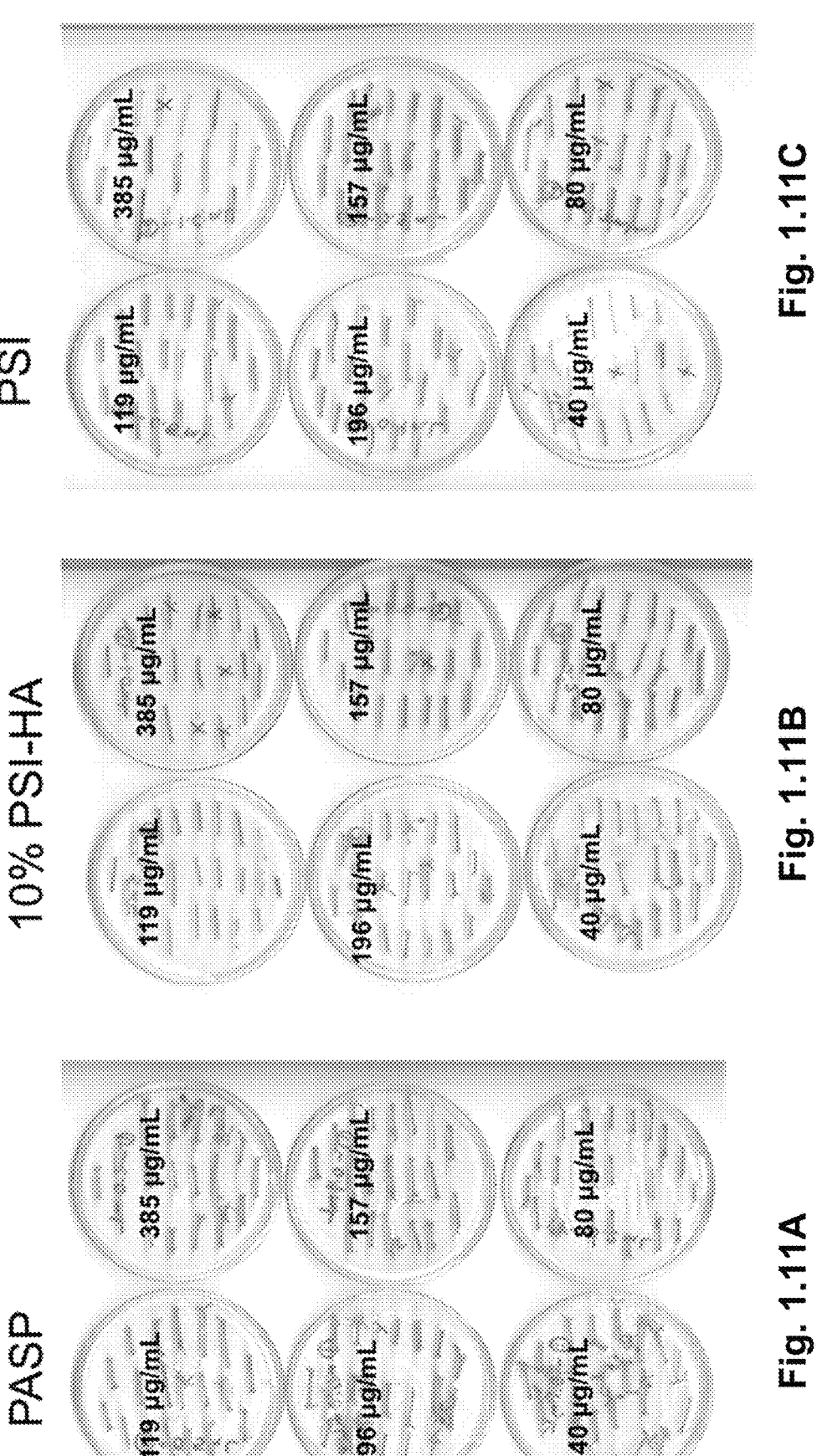
Fig. 1.11A
Fig. 1.11B
Fig. 1.11C

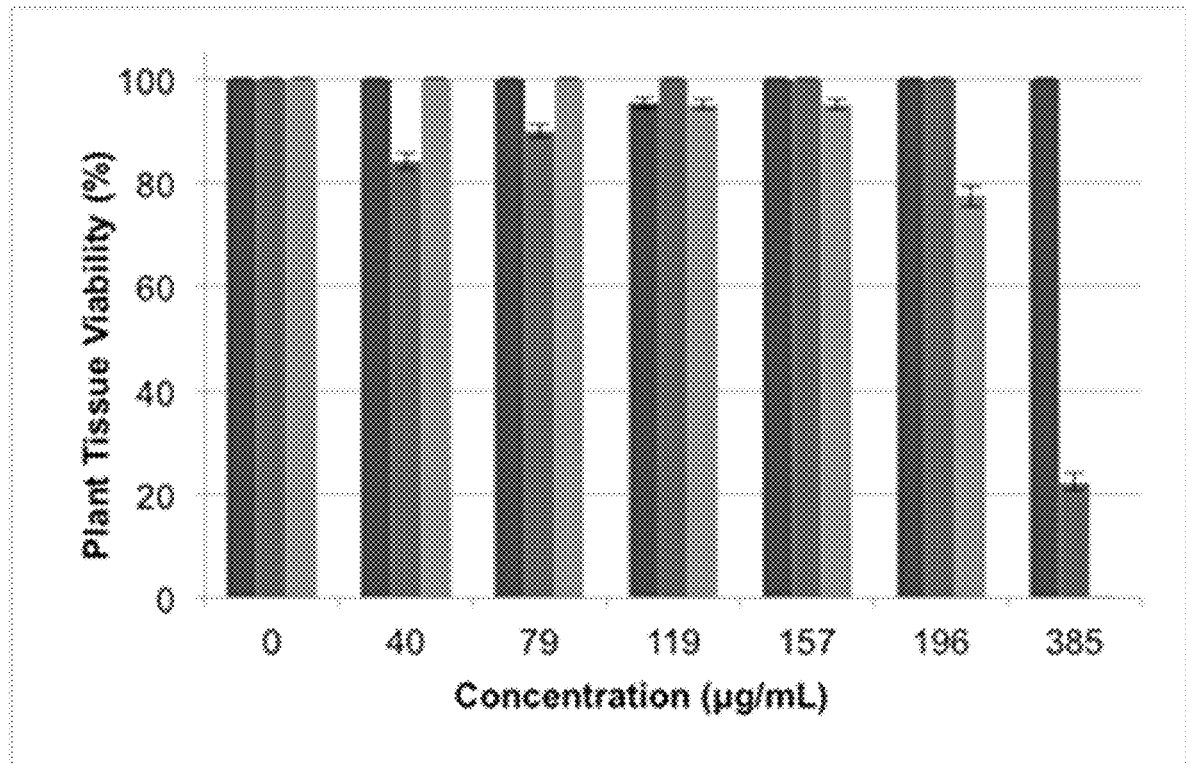
PASP (■), PSI (■), and PSI-HA (■)
Fig. 1.12

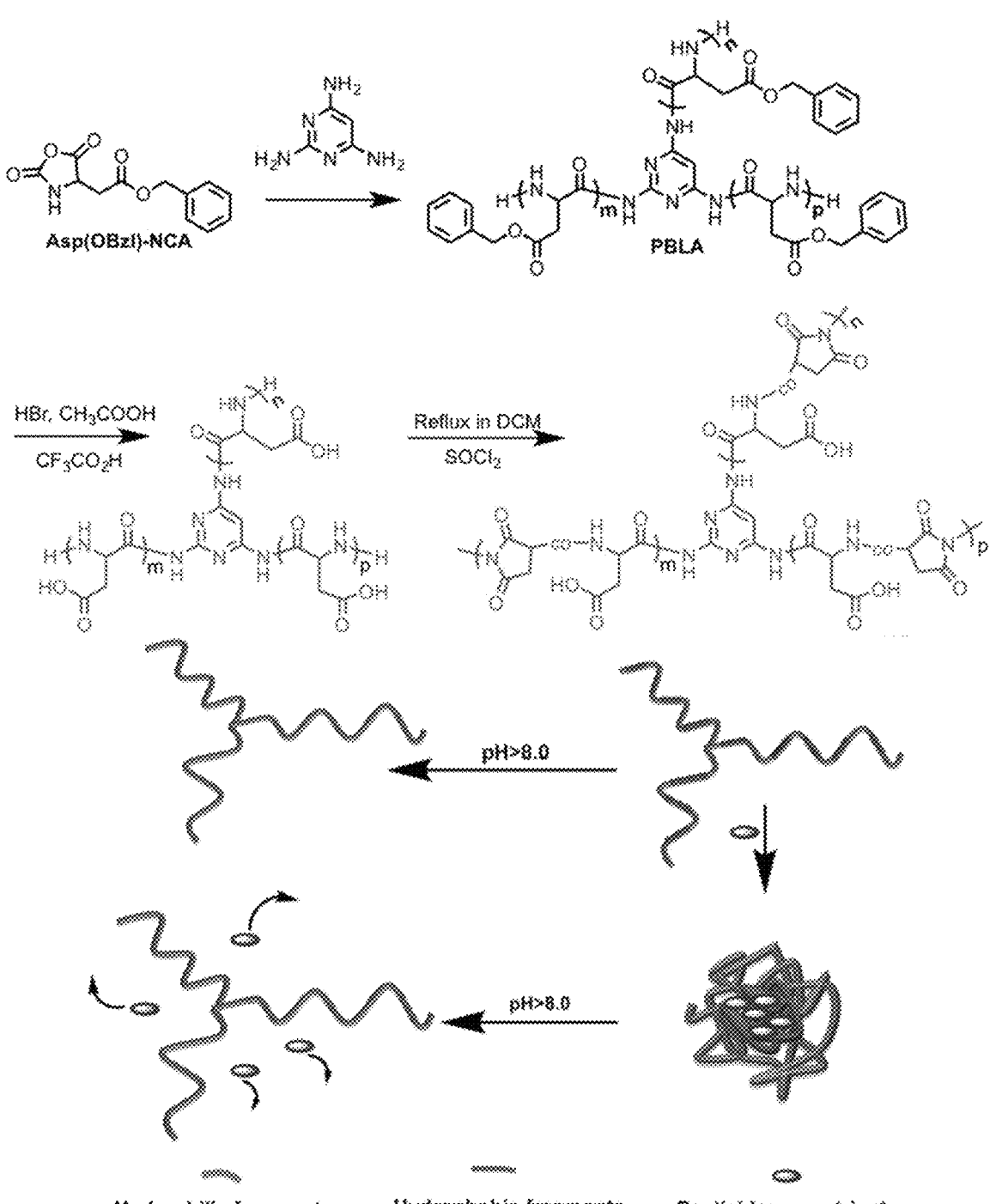
Fig. 2.1

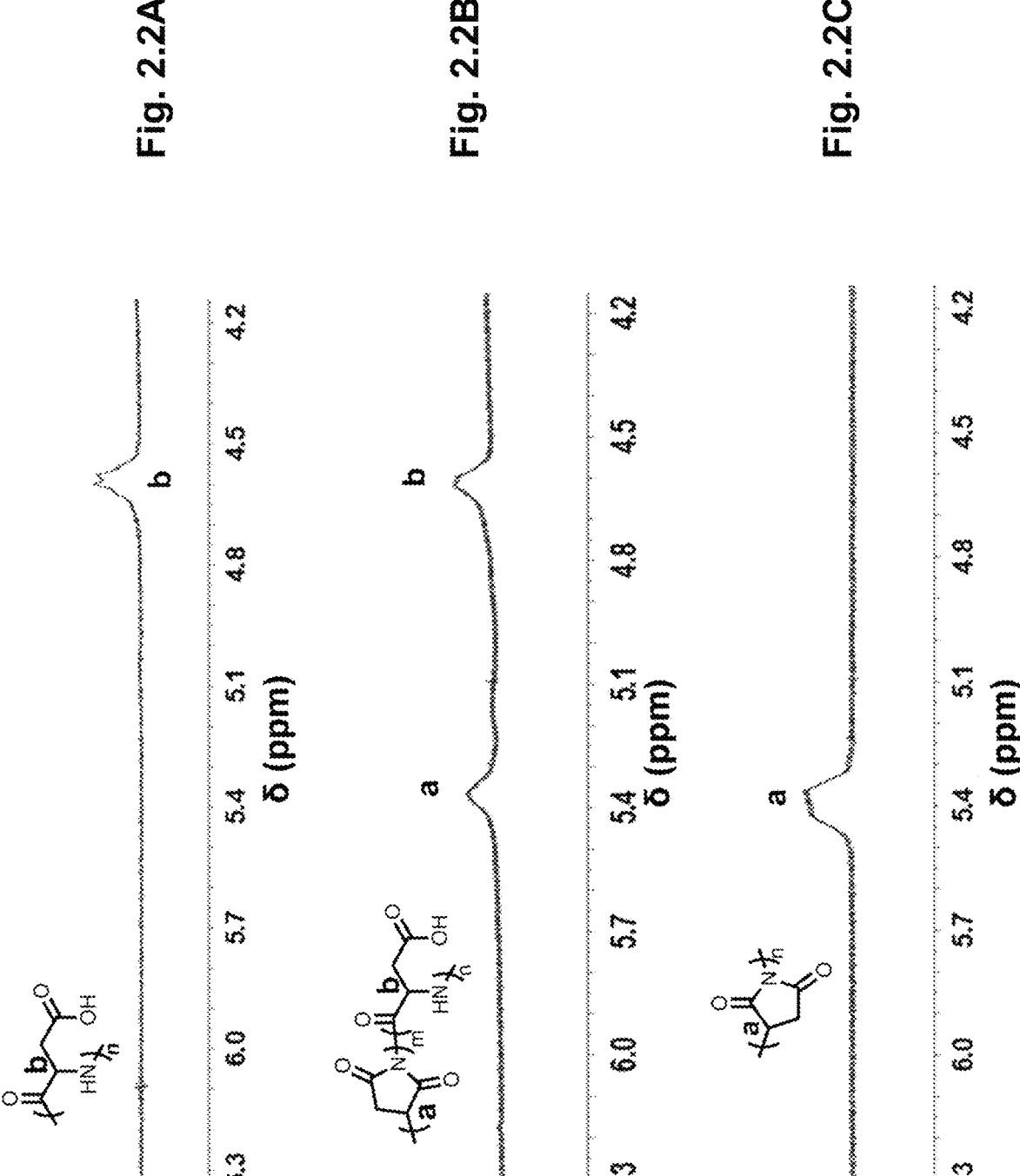
Fig. 2.2A
Fig. 2.2B
Fig. 2.2C

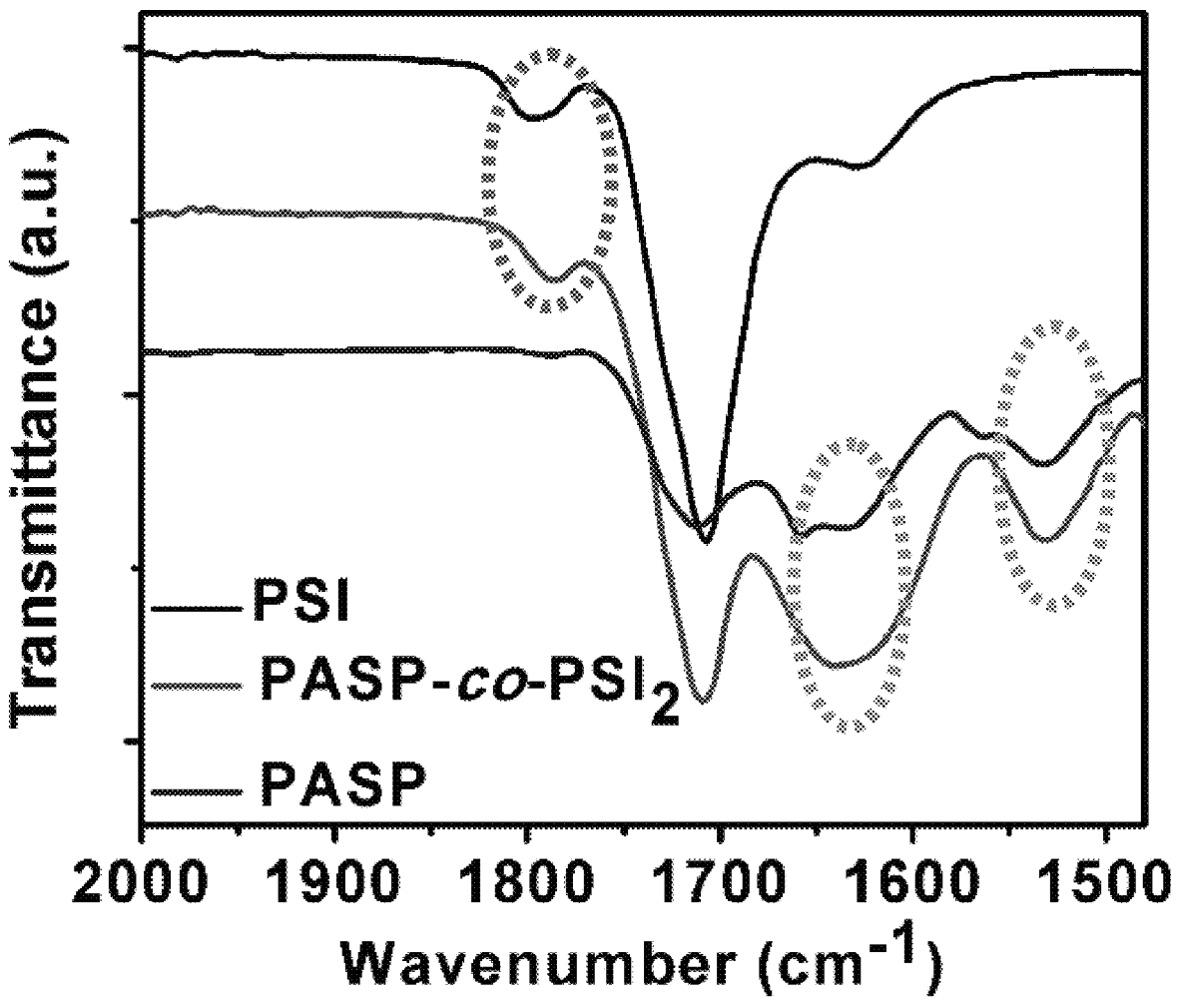
Fig. 2.3

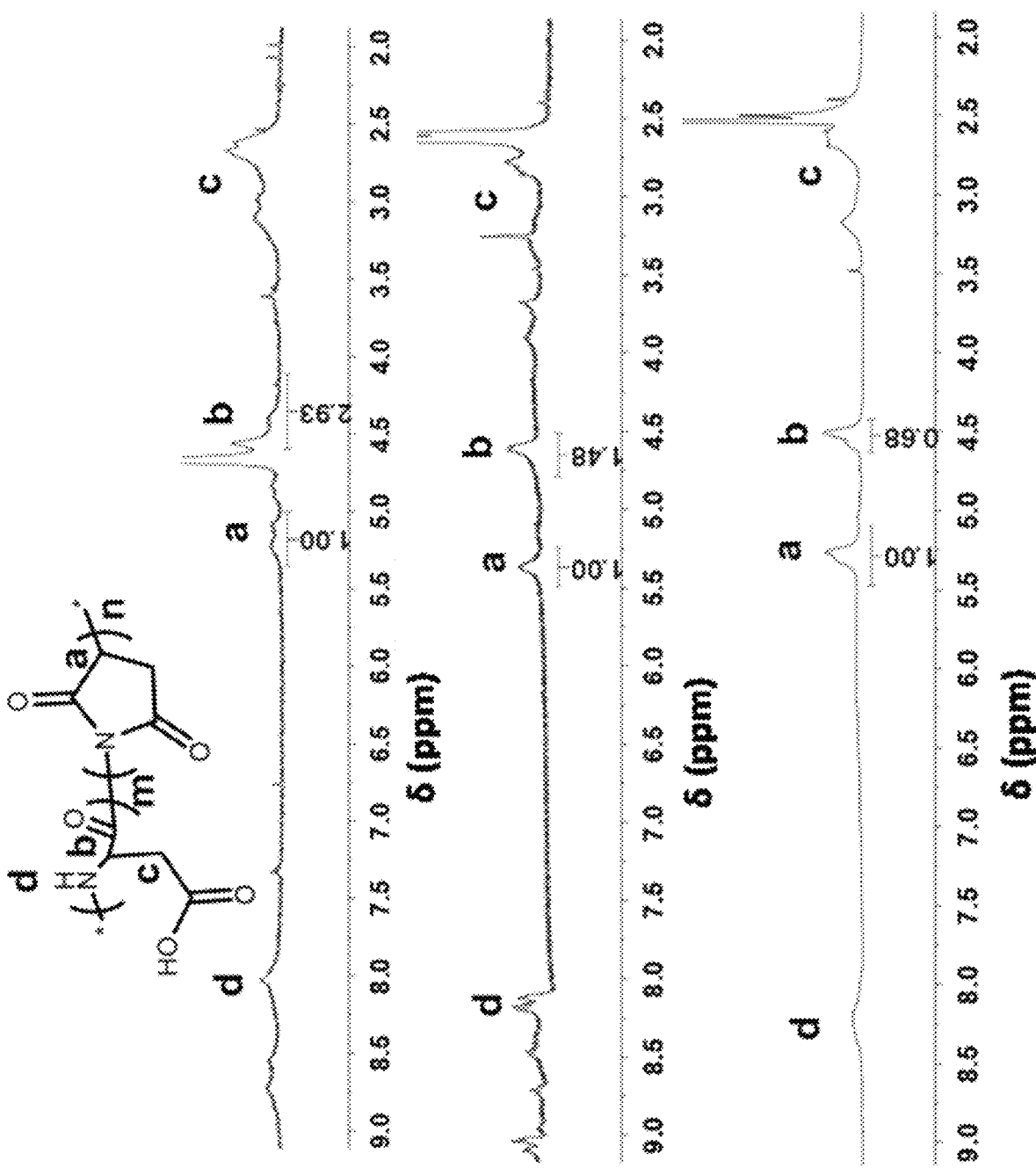
Fig. 2.4

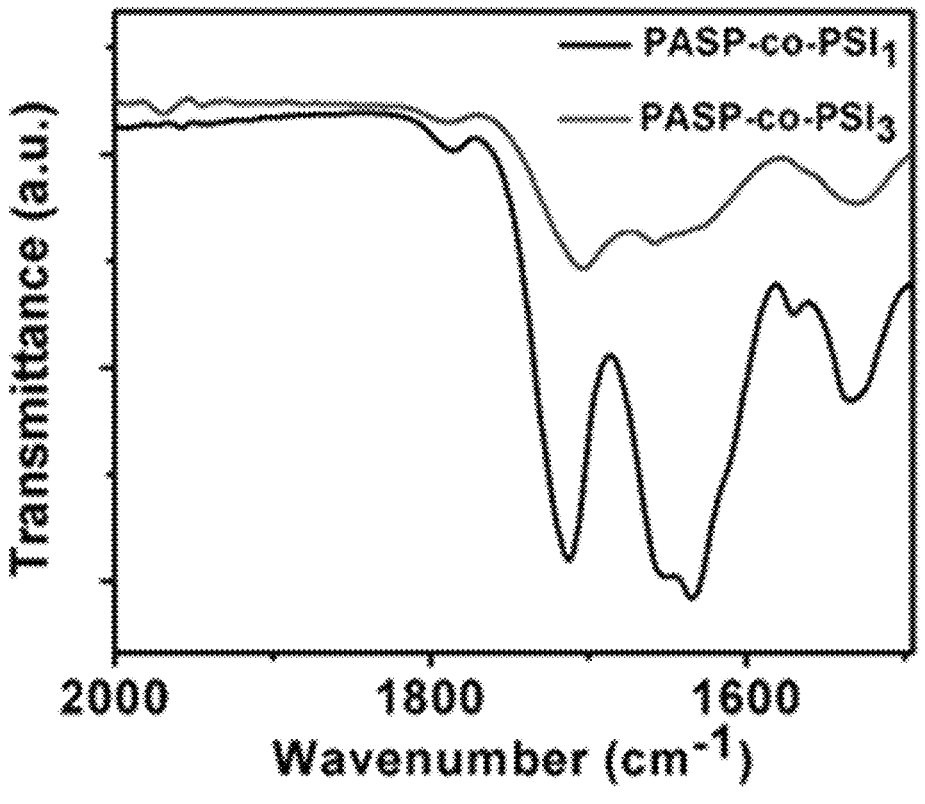
Fig. 2.5
Fig. 2.6A                    Fig. 2.6B

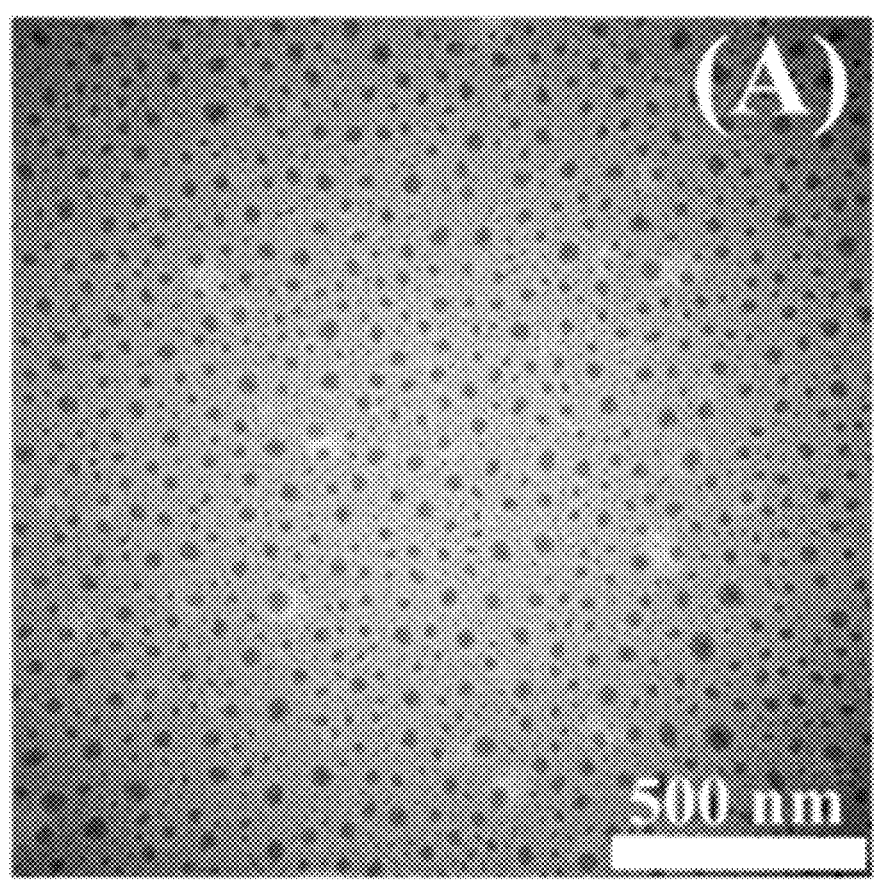
Fig. 2.7A
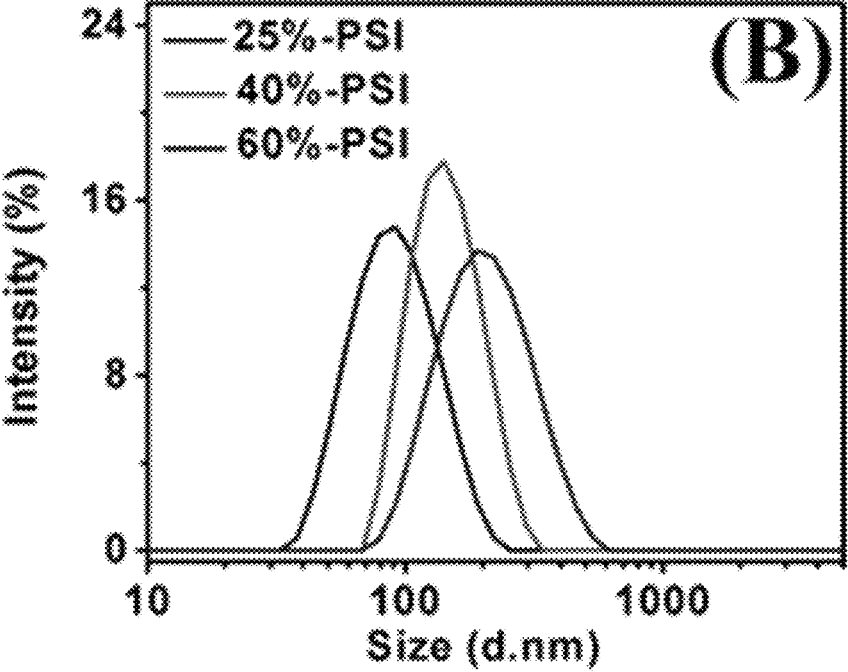
Fig. 2.7B

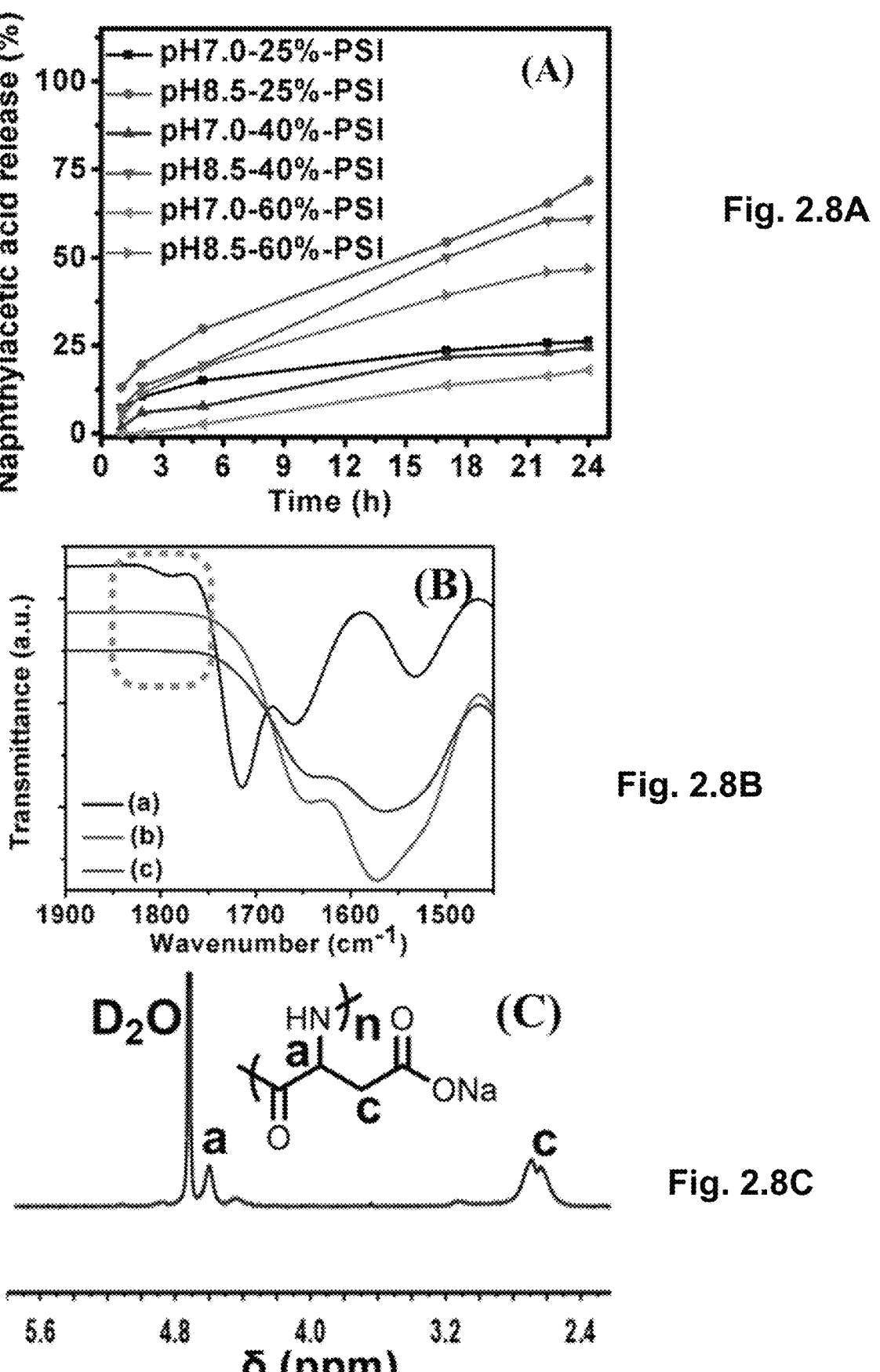
Fig. 2.8A
Fig. 2.8B
Fig. 2.8C

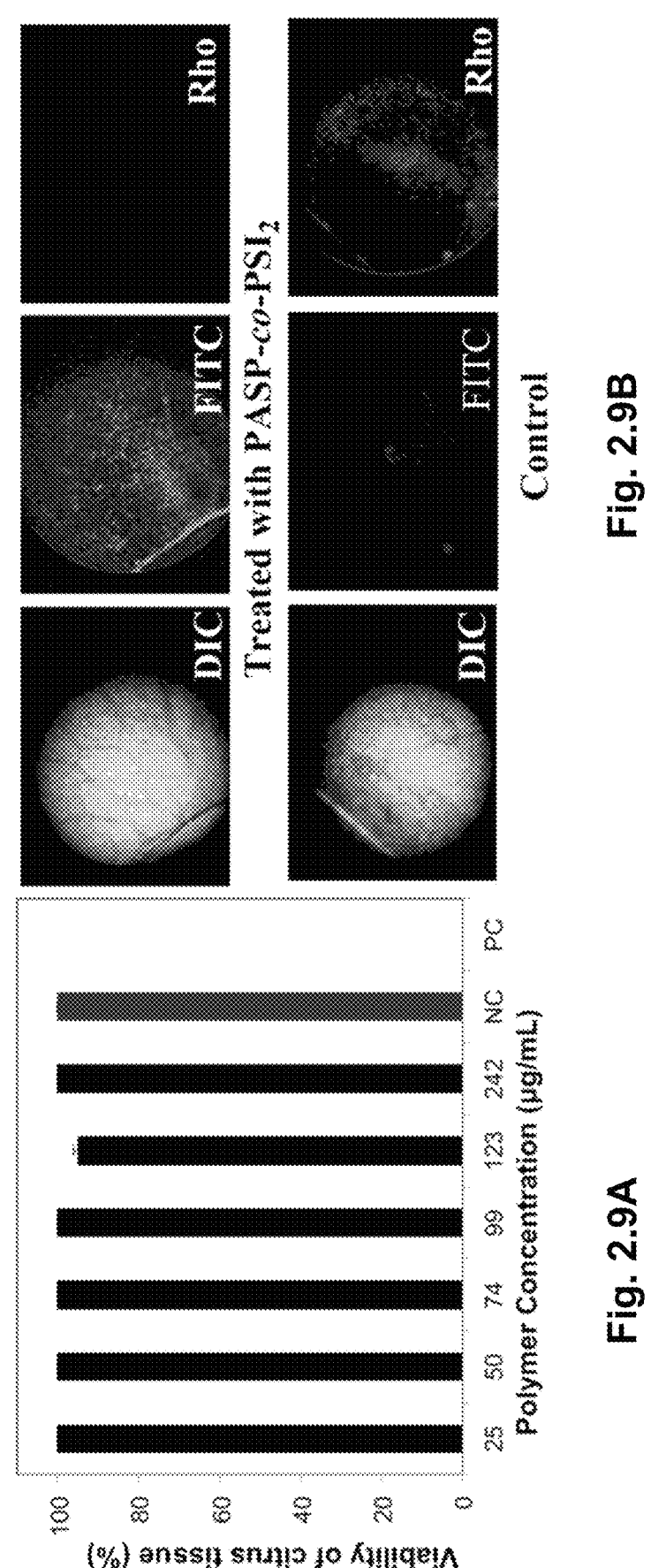
Fig. 2.9B
Fig. 2.9A

Figures 2.10, 2.11:
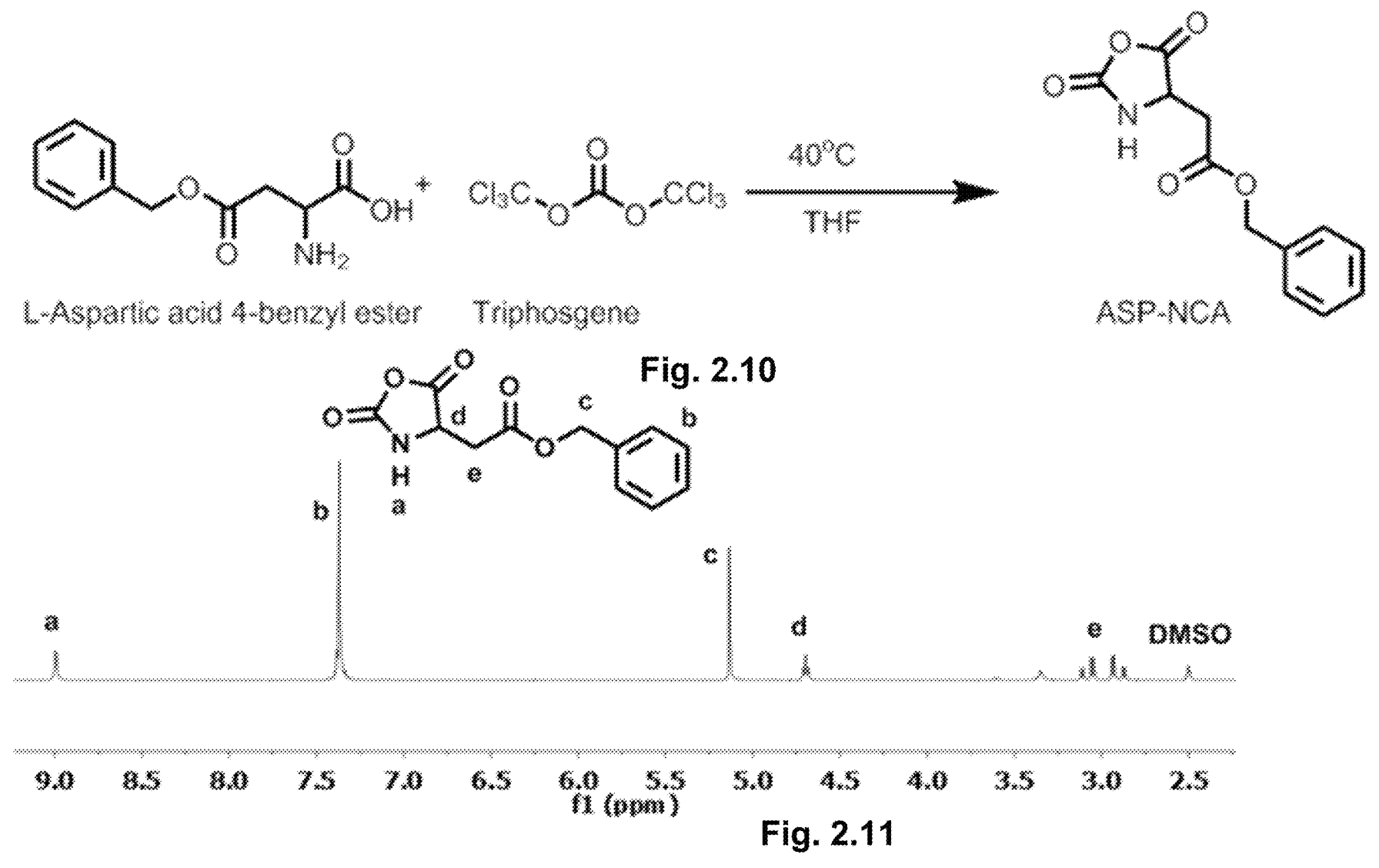

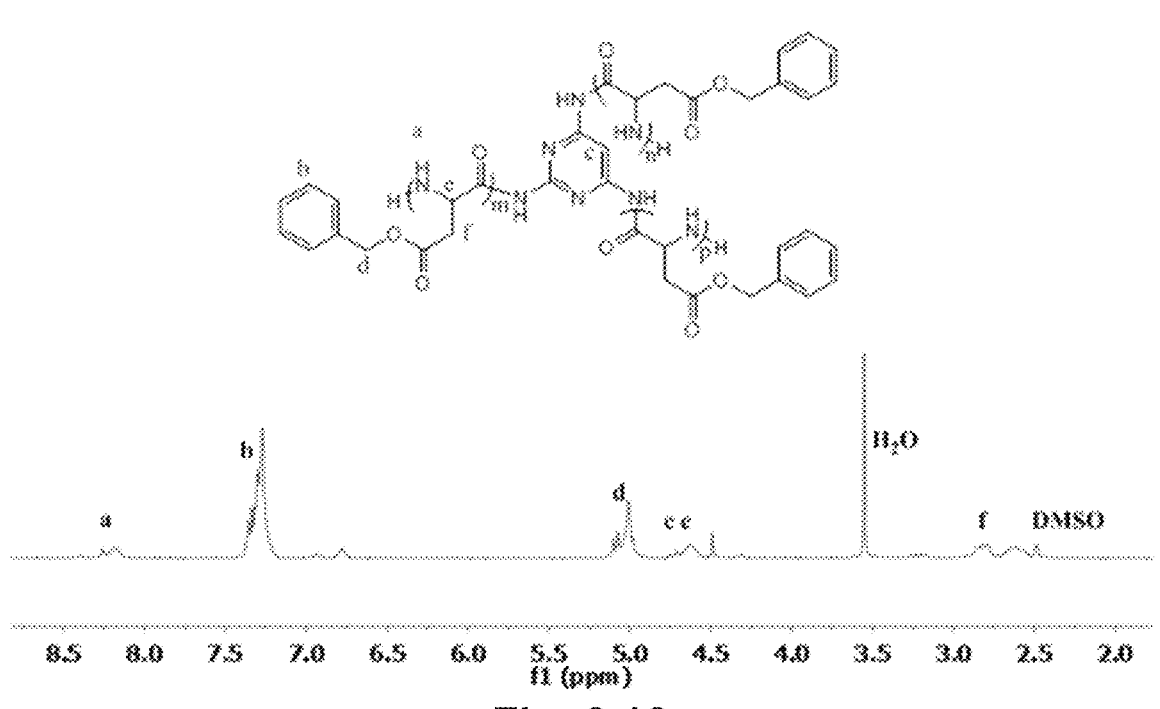
Fig. 2.12
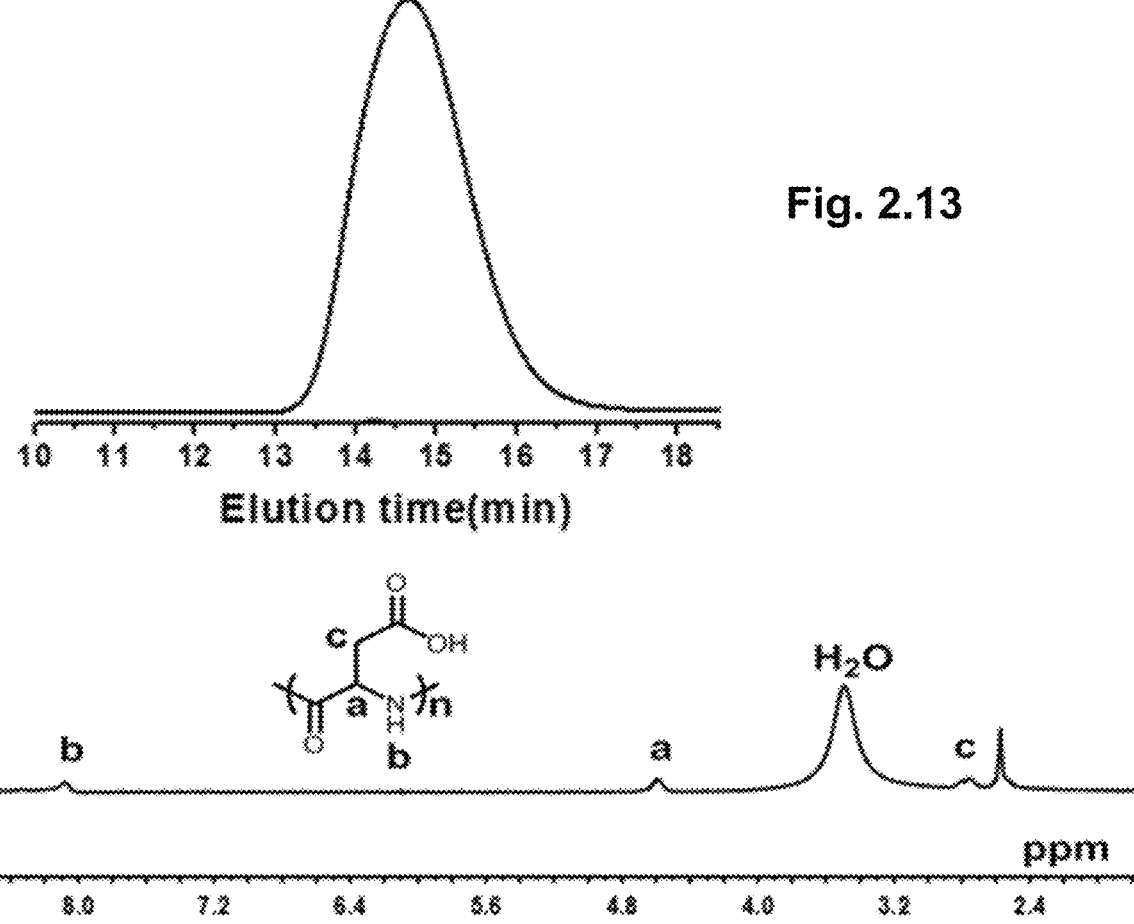
Fig. 2.13
Fig. 2.14

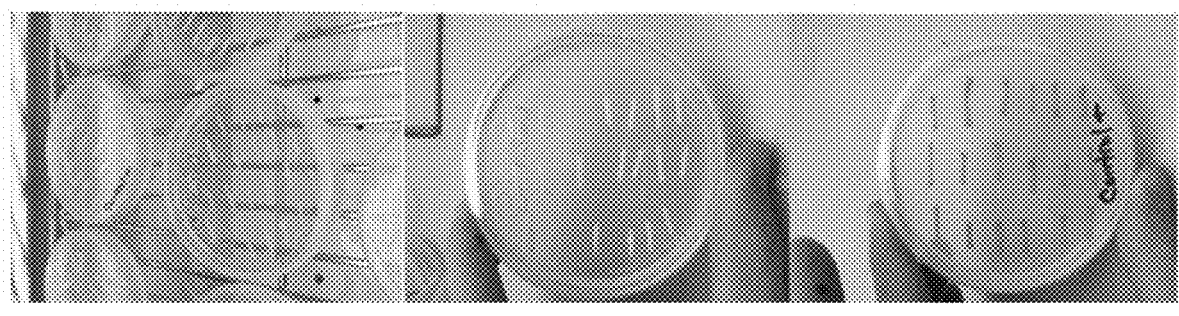
Fig. 2.15A          Fig. 2.15B          Fig. 2.15C
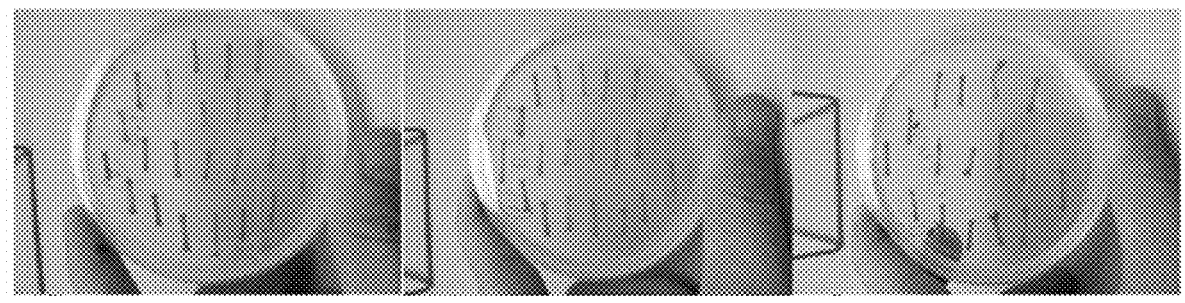
Fig. 2.15D          Fig. 2.15E          Fig. 2.15F
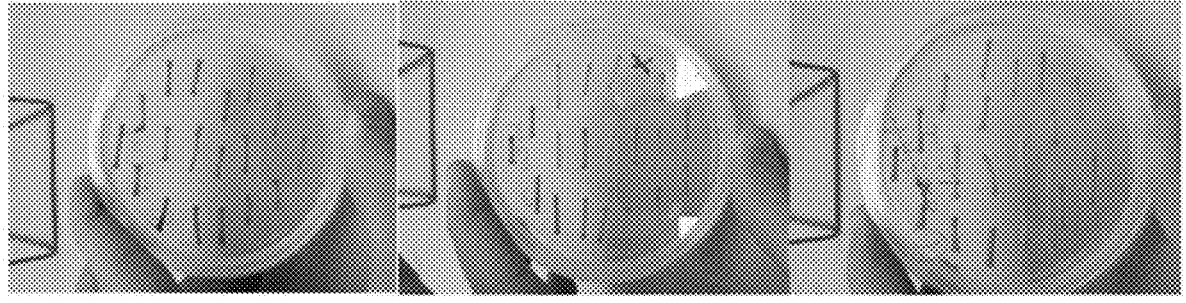
Fig. 2.15G          Fig. 2.15H          Fig. 2.15I

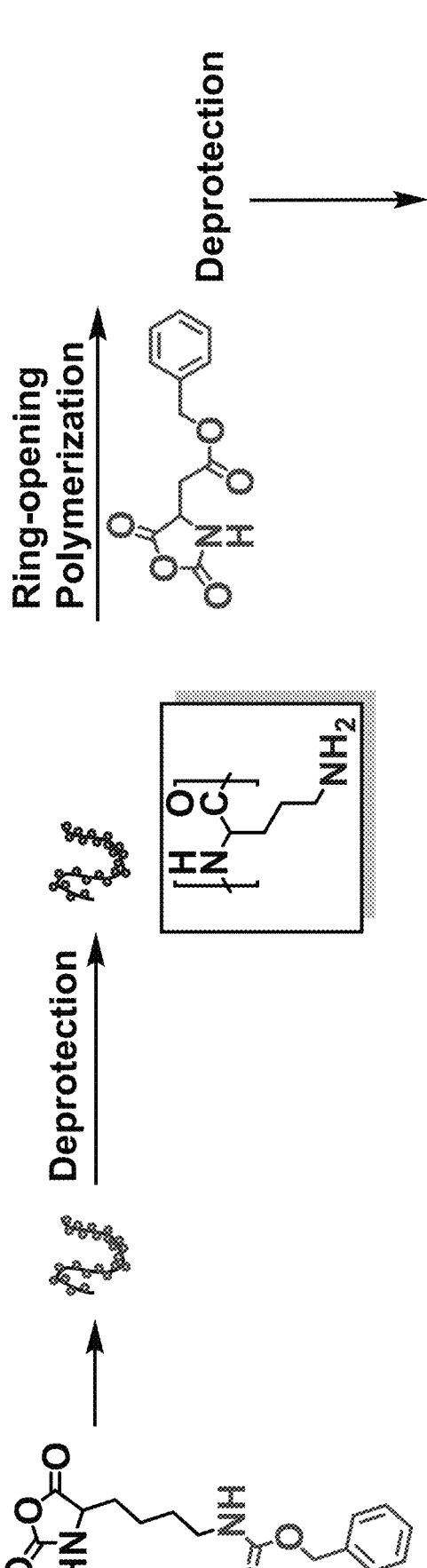
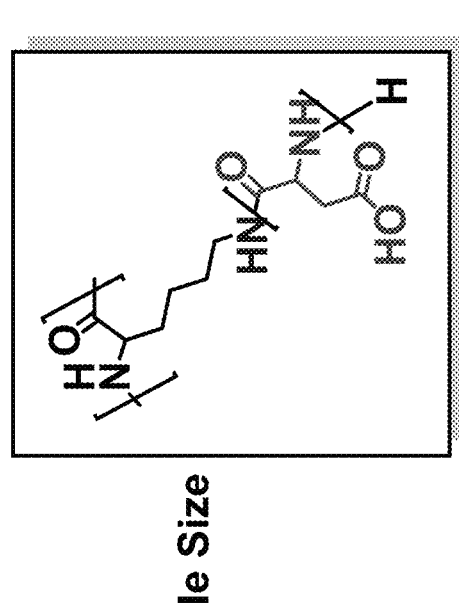
Fig. 3.1

Fig. 3.2

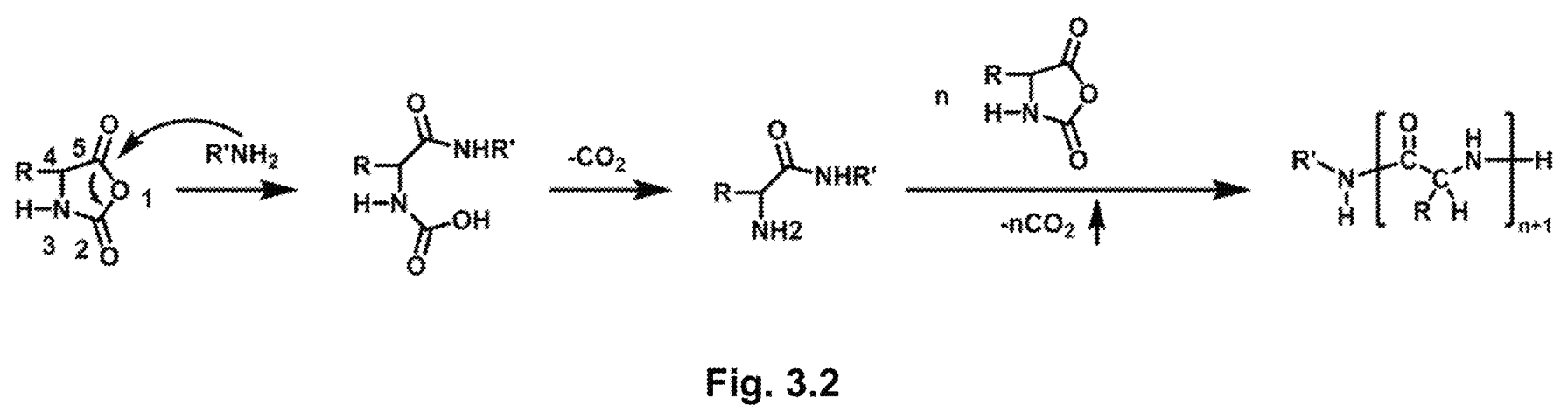

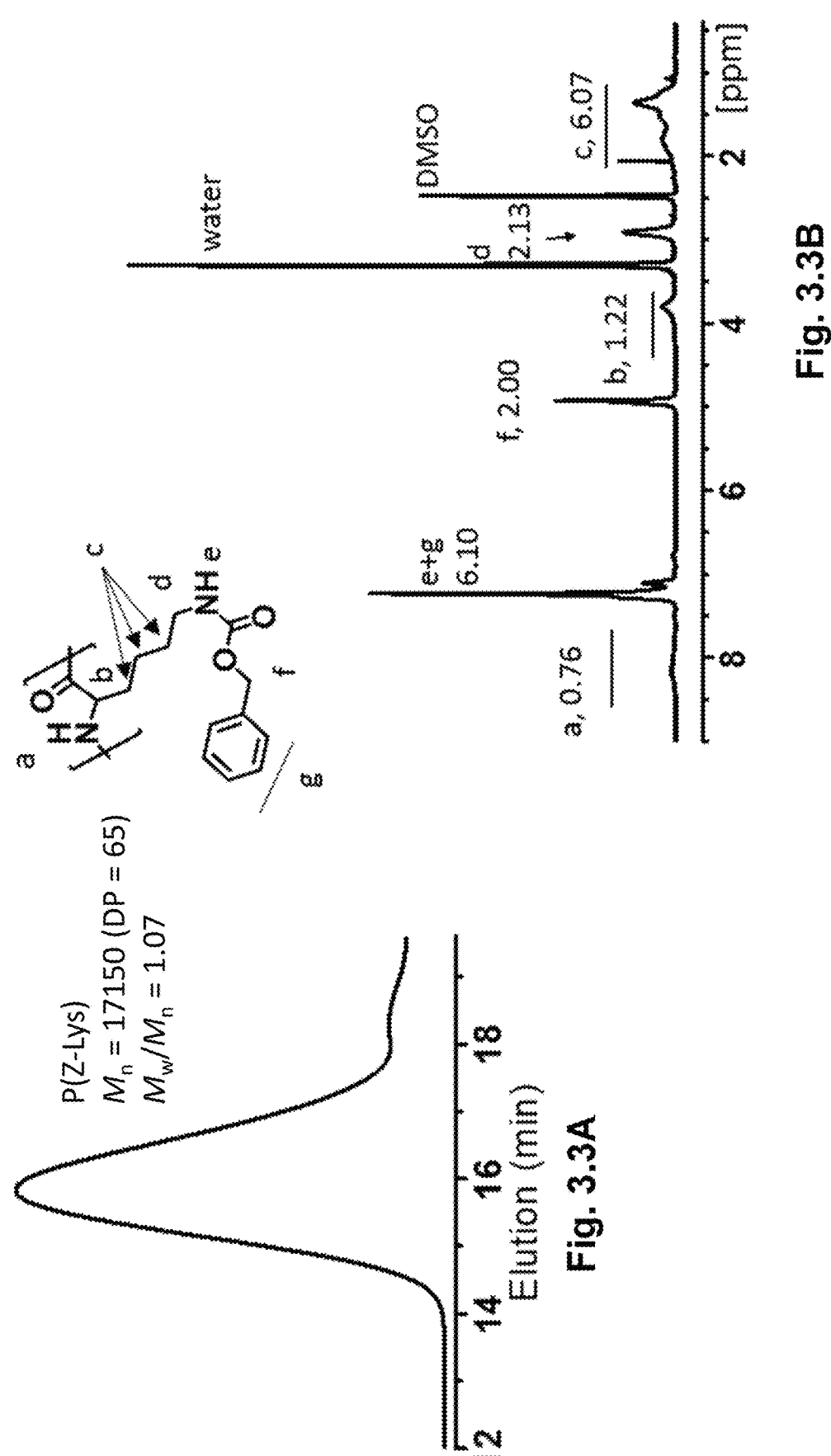
Fig. 3.3B
Fig. 3.3A

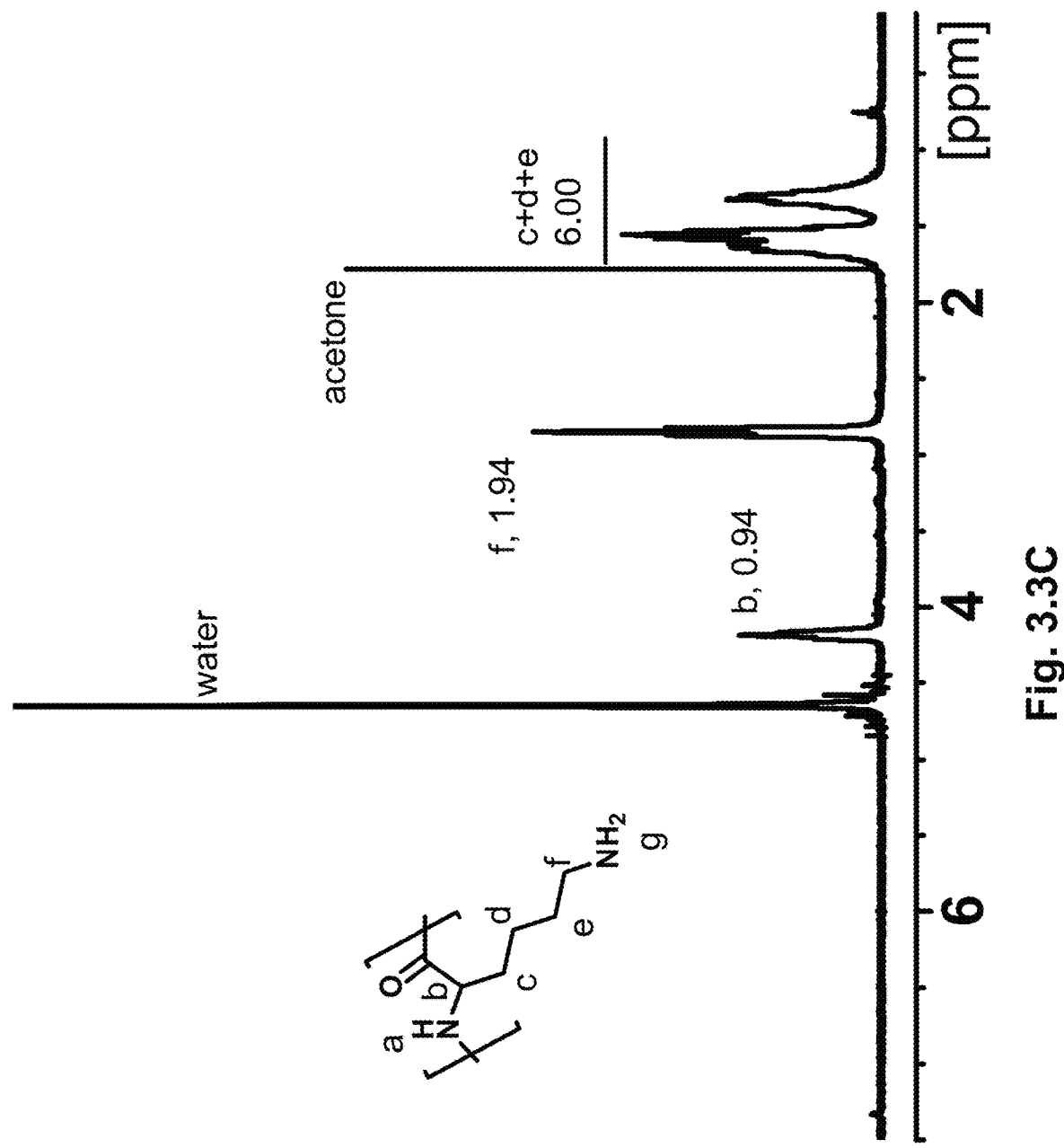
Fig. 3.3C

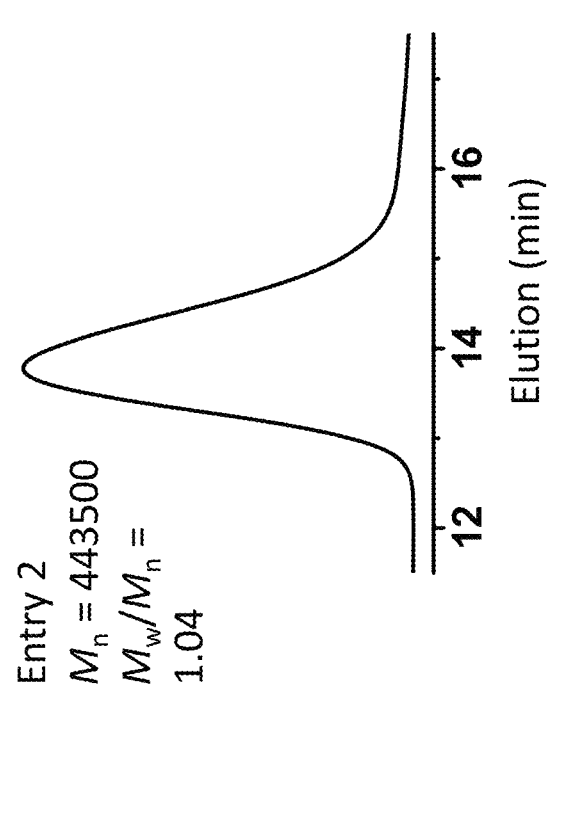
Entry 2
$M_n = 443500$
$M_w/M_n = 1.04$
Fig. 3.4B
Fig. 3.4C
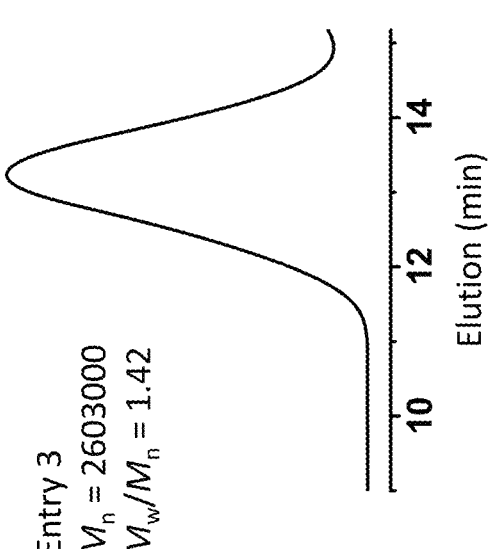
Entry 3
$M_n = 2603000$
$M_w/M_n = 1.42$
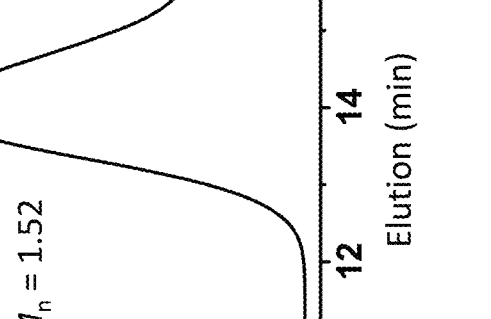
Entry 1
$M_n = 268800$
$M_w/M_n = 1.52$
Fig. 3.4A

Fig. 3.5

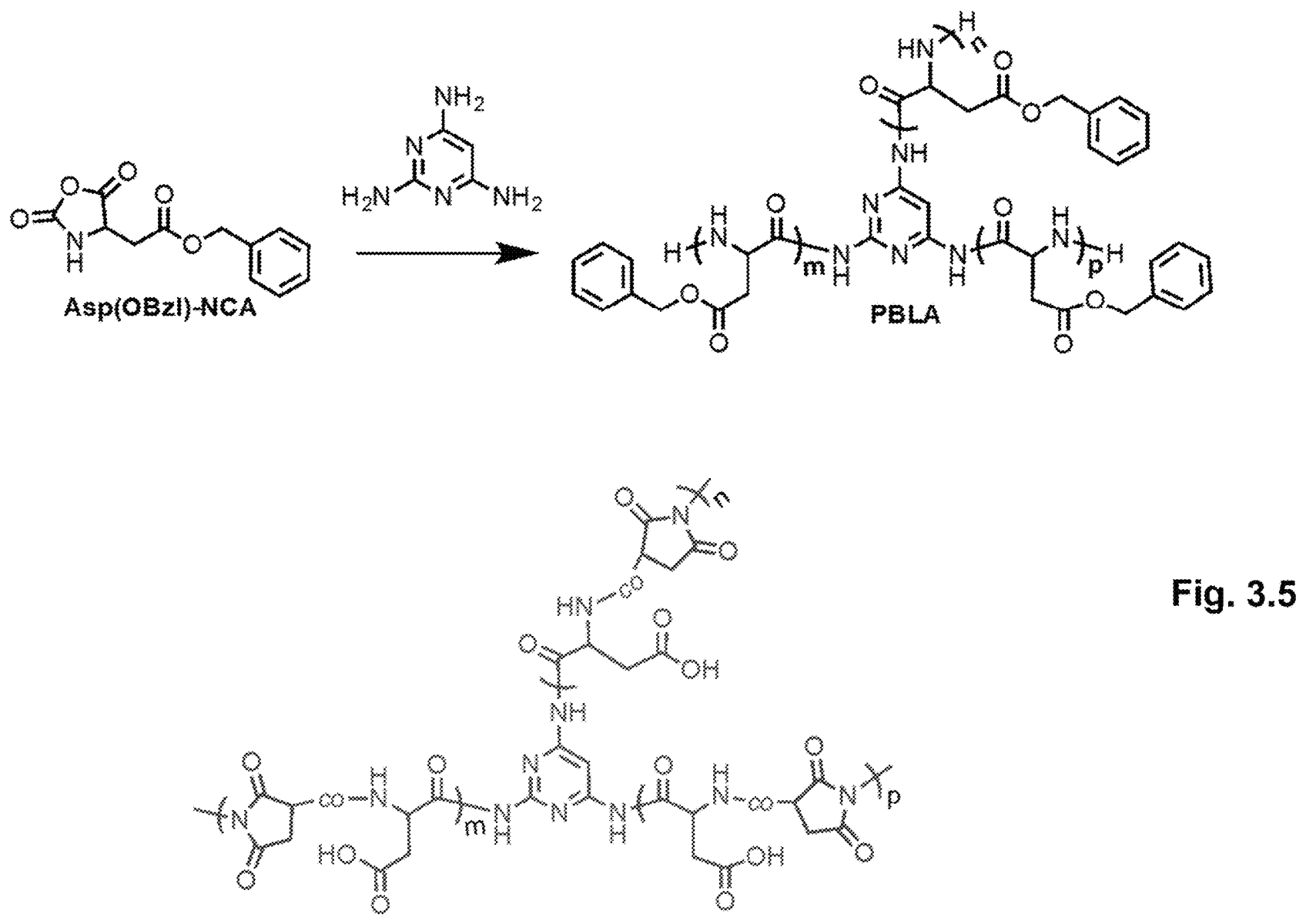

PBLA

Asp(OBzl)-NCA

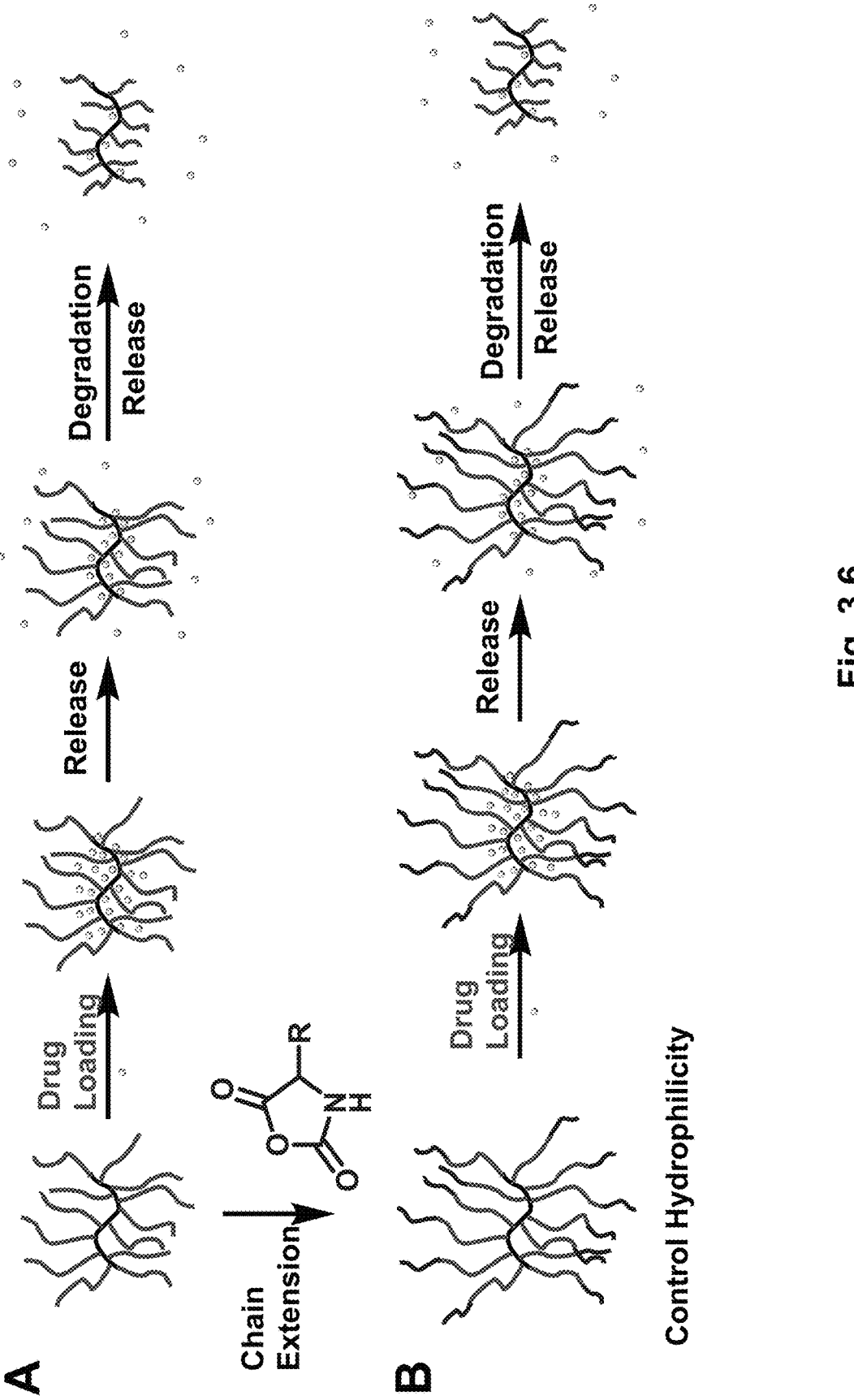
Fig. 3.6

STIMULI-RESPONSIVE POLYMERIC NANOPARTICLES, METHODS OF MAKING STIMULI-RESPONSIVE POLYMERIC NANOPARTICLES, AND METHODS OF USING STIMULI-RESPONSIVE POLYMERIC NANOPARTICLES

CROSS-REFERENCE TO RELATED APPLICATIONS

This application is a continuation of U.S. patent application Ser. No. 16/066,926, filed Jun. 28, 2018, entitled "STIMULI-RESPONSIVE POLYMERIC NANOPAR-TICLES, METHODS OF MAKING STIMULI-RESPON-SIVE POLYMERIC NANOPARTICLES, AND METHODS OF USING STIMULI-RESPONSIVE POLYMERIC NAN-OPARTICLES," which is the 35 U.S.C. § National Stage application of International Application No. PCT/US2016/069200, filed Dec. 29, 2016, entitled "STIMULI-RESPON-SIVE POLYMERIC NANOPARTICLES, METHODS OF MAKING STIMULI-RESPONSIVE POLYMERIC NAN-OPARTICLES, AND METHODS OF USING STIMULI-RESPONSIVE POLYMERIC NANOPARTICLES," which claims the benefit of and priority to U.S. Provisional Appli-cation Ser. No. 62/275,441, filed Jan. 6, 2016, entitled "STIMULI-RESPONSIVE POLYMERIC NANOPAR-TICLES, METHODS OF MAKING STIMULI-RESPON-SIVE POLYMERIC NANOPARTICLES, AND METHODS OF USING STIMULI-RESPONSIVE POLYMERIC NAN-OPARTICLES," and the disclosures which are incorporated herein by reference in their entireties.

STATEMENT REGARDING FEDERALLY SPONSORED RESEARCH OR DEVELOPMENT

This invention was made with Government support under contract DMR 1265388 awarded by the National Science Foundation. The Government has certain rights in the inven-tion.

BACKGROUND

Although pH-responsive materials have been extensively studied in the realm of medicine, less attention has been given to the application of these adaptive materials in agriculture. Despite the relative lack of attention in agricul-tural sciences, responsive polymeric nanoparticles have sig-nificant potential to enhance the delivery efficacy of pesti-cides, nutrients, and drugs, which can in turn provide valuable benefits to help cure deadly plant diseases. Thus, there is a need to address this situation.

SUMMARY

Embodiments of the present disclosure provide for com-positions including polymer particles, methods of making compositions, methods of using the composition, stimuli-responsive methods of delivering agents, and the like.

An embodiment of the present disclosure includes, among others, a composition including: a polymer particle includ-ing a polymer and an agent, wherein the polymer particle is amphiphilic under a first condition, wherein the polymer particle is hydrophilic under a second condition, wherein in the first condition the agent is encapsulated by the polymer, wherein in the second condition the agent is released from the polymer, wherein the polymer includes a responsive unit and optionally a hydrophilic unit, wherein the responsive unit is hydrophilic at the second condition, wherein the responsive unit is responsive to: a change in the pH envi-ronment around the polymer particle from a pH of about 6-6.5 to a pH of about 7-8.5 changes the polymer particle from hydrophobic to hydrophilic; a change in the sugar level around the polymer particle from about 1 mM to at least about 10 mM changes the polymer particle from hydropho-bic to hydrophilic; or a combination thereof. In an embodi-ment, the polymer particle has a diameter of about 30 nm or less.

An embodiment of the present disclosure includes, among others, a method including: exposing a plant to a composi-tion including a polymer particle, wherein the polymer particle includes a polymer and an agent, wherein the polymer particle is amphiphilic under a first condition, wherein the polymer particles is hydrophilic under a second condition, wherein in the first condition the agent is encap-sulated by the polymer, wherein in the second condition the agent is released from the polymer; and releasing the agent when the polymer particle is exposed to the second condi-tion in plant. In an embodiment the polymer includes a responsive unit and optionally a hydrophilic unit, wherein the responsive unit is hydrophilic at the second condition, wherein the responsive unit is responsive to: a change in the pH environment around the polymer particle from a pH of about 6-6.5 to a pH of about 7-8.5 changes the polymer particle from hydrophobic to hydrophilic; a change in the sugar level around the polymer particle from about 1 mM to at least about 10 mM changes the polymer particle from hydrophobic to hydrophilic; or a combination thereof.

Other compositions, methods, features, and advantages will be or become apparent to one with skill in the art upon examination of the following drawings and detailed descrip-tion. It is intended that all such additional compositions, methods, features and advantages be included within this description, be within the scope of the present disclosure, and be protected by the accompanying claims.

BRIEF DESCRIPTION OF THE DRAWINGS

FIG. 1.1 is a scheme representing the preparation of PSI from acid-catalyzed condensation of L-aspartic acid and hydrolysis to PASP.

FIG. 1.2 is a scheme representing a PSI-based nanode-livery system: (step a) PSI is synthesized through the step-growth condensation reaction of L-aspartic acid and (step b) functionalized with primary amines to prepare amphiphilic and pH-responsive PSI copolymers. (step c) Amphiphilic PSI copolymers are assembled into nanopar-ticles and, (step d) loaded with hydrophobic molecules, (step e) which may disassemble and release loaded components at elevated pH, leaving behind the water-soluble and biode-gradable poly(aspartic acid) derivative polymer.

FIG. 1.3 is a scheme representing a preparation of amphi-philic PSI copolymers by reacting with 2-amino(ethoxy) ethanol (2AEE), NaOH, or hexyl amine (HA).

FIG. 1.4 shows the $^1$H NMR spectra of PSI-HA copoly-mers with functionalization 7-92%.

FIG. 1.5 Hydrodynamic diameter ($D_h$ (nm) as determined by DLS) of PSI-nanoparticles versus percent functionaliza-tion with HA for nanoparticles precipitated at different concentrations (100 mg/mL, 50 mg/mL, 20 mg/mL, 10 mg/mL, and 5 mg/mL).

FIGS. 1.6A-C show PSI-nanoparticles formed by nano-precipitation of amphiphilic PSI-copolymer solutions into DI water. FIG. 1.6A shows the Z-average hydrodynamic diameter as a function of solution concentration for several copolymers, which shows an increasing $D_h$ with increasing solution concentration. FIG. 1.6B illustrates the DLS overlay of PSI-HA (55% HA functionalization) nanoparticles prepared from different solution concentrations (100, 50, 20, 10, and 5 mg/mL), and FIG. 1.6C illustrates TEM image of nanoparticles formed at 50 mg/mL.

FIG. 1.7 shows the zeta potential and DLS size distribution for 15% PSI-HA with 1% hydrolysis.

FIG. 1.8A is a fluorescence calibration of Nile Red in DMF with λ excitation=530 nm and λ emission=650 nm. FIG. 1.8B illustrates the fluorescence intensity of loaded 1% PSI-HA nanoparticles compared to Nile red in water. FIG. 1.8C illustrates TEM images of 50% PSI-HA nanoparticles before Nile red loading (left, clear), and after loading (right, pink).

FIGS. 1.9A-C demonstrate release of Nile red was monitored from PSI-based copolymer nanoparticles. FIG. 1.9A illustrates this with 1% PSI-2AEE in buffers of various pH (6, 7, 8, 8.5), FIG. 1.9B illustrates this with varying degrees of functionalization of PSI-HA (5%, 10%, and 50%) at pH 8.5, and FIG. 1.9C illustrates this with varying nanoparticle size at pH 8.5.

FIG. 1.10 shows release of Nile Red with varying functionalizing moieties (1% functionalization PSI-HA, PSI-2AEE, and PSI-PAsp).

FIGS. 1.11A-C shows a plant tissue toxicity study of various polymer concentrations after 21 days of (FIG. 1.11A) PASP, (FIG. 1.11B) 10% PSI-HA, and (FIG. 1.11C) PSI.

FIG. 1.12 is a graph demonstrating plant tissue (citrus seed sapling) viability at various concentrations of PASP (left), PSI (middle), and PSI-HA (right).

FIG. 2.1 is a scheme demonstrating synthesis and pH-responsive behavior of three-arm star copolymers of poly (aspartic acid-co-succinimide) and their subsequent hydrolysis to polyaspartate.

FIGS. 2.2A-C are $^1$H NMR spectra of (FIG. 2.2A) poly (aspartic acid) (PASP), (FIG. 2.2B) (poly(aspartic acid)$_{26}$-co-polysuccinimide$_{17}$)$_3$ (PASP$_{26}$-co-PSI$_{17}$)$_3$ and (FIG. 2.2C) polysuccinimide (PSI).

FIG. 2.3 illustrates FT-IR spectrum of polysuccinimide (PSI), (PASP$_{26}$-co-PSI$_{17}$)$_3$ (PASP-co-PSI$_2$), and poly(aspartic acid) (PASP).

FIG. 2.4 illustrates the $^1$H NMR spectrum of (PASP$_{32}$-co-PSI$_{11}$)$_3$ (25% PSI), (PASP$_{26}$-co-PSI$_{17}$)$_3$ (40% PSI), and (PASP$_{17}$-co-PSI$_{26}$)$_3$ (60% PSI).

FIG. 2.5 illustrates the FT-IR spectrum of (a) PASP-co-PSI$_1$ (PASP$_{32}$-co-PSI$_{11}$)$_3$ and PASP-co-PSI$_3$ (PASP$_{26}$-co-PSI$_{17}$)$_3$.

FIGS. 2.6A-B are transmission electron microscope (TEM) images of (PASP$_{32}$-co-PSI$_{11}$)$_3$ (FIG. 2.6A) and (PASP$_{17}$-co-PSI$_{26}$)$_3$ (FIG. 2.6B).

FIG. 2.7A is a transmission electron microscope (TEM) image of (PASP$_{26}$-co-PSI$_{17}$)$_3$ and FIG. 2.7B shows dynamic light scattering (DLS) size distributions of PASP-co-PSI self-assemblies showing Z-average hydrodynamic diameters of: (PASP$_{32}$-co-PSI$_{11}$)$_3$, (25%-PSI)=75 nm (PASP$_{26}$-co-PSI$_{17}$)$_3$, (40%-PSI)=140 nm and (PASP$_{17}$-co-PSI$_{26}$)$_3$ (60%-PSI)=186 nm.

FIGS. 2.8A shows pH-dependent release profile of 1-naphthaleneacetic acid from (PASP32-co-PSI11)3, (25% PSI), (PASP26-co-PSI17)3 (40% PSI) and (PASP17-co-PSI26)3 (60% PSI) nanoparticles. FIG. 2.8B illustrates the FTIR spectrum of hydrolysate of (PASP26-co-PSI17)3: (a) Control of (PASP26-co-PSI17)3; (b) Control of polyaspartate; (c) (PASP26-co-PSI17)3 for 48 h at pH=8.5; (FIG. 2.8C) 1H NMR spectrum of poly(PASP26-co-PSI17)3 after aging at pH 8.5 for 48 h.

FIGS. 2.9A-B illustrate toxicity evaluation of (PASP$_{26}$-co-PSI$_{17}$)$_3$ by (FIG. 2.9A) plant tissue culture (where NC=negative control (no polymer) and PC=positive control (complete tissue death induced by high concentrations of a toxicant) and (FIG. 2.9B) dual color fluorescent staining system. Top image shows the results of a live citrus leaf treated with (PASP$_{26}$-co-PSI$_{17}$)$_3$ and the bottom image shows the results from analysis of a dead citrus leaf (Red areas indicate dead citrus cells and green areas indicate living citrus cells; DIC=Differential interference contrast; FITC=fluorescein isothiocyanate fluorescence setting; Rho=Rhodamine fluorescence setting.

FIG. 2.10 is a scheme illustrating synthesis of Asp-NCA.

FIG. 2.11 shows $^1$H NMR spectrum of ASP-NCA.

FIG. 2.12 shows $^1$H NMR spectrum of PBLA.

FIG. 2.13 shows gel permeation chromatography trace for the PBLA precursor ($M_n$=26,600 g/mol, $M_w/M_n$=1.2).

FIG. 2.14 shows $^1$H NMR spectrum of PASP.

FIGS. 2.15A-I demonstrate toxicity assessment of (PASP$_{26}$-co-PSI$_{17}$)$_3$, by citrus tissue culture. (2.15A) Seeding citrus tissues onto plates for lighting culture; (2.15B) Positive control, poly(L-aspartic acid)$_{50}$-b-poly(L-leucine)$_{50}$-b-poly(L-lysine)$_{50}$ of 99 μg/mL and higher were found to was added elicit complete tissue death; (2.15C) Negative control, nothing was added to MSBC medium, all explants should survive; (2.15D-I) citrus tissues treated with different concentration random (PASP$_{26}$-co-PSI$_{17}$).

FIG. 3.1 illustrates Scheme 1: synthesis of the star polymers by core-first method.

FIG. 3.2 illustrates Scheme 2: Polymerization of NCA monomers initiated by (primary) amine. (Aliferis, T.; Iatrou, H.; Hadjichristidis, N. Biomacromolecules 2004, 5 (5), 1653).

FIGS. 3.3A-C illustrate the characterization of PLys. FIG. 3.3A illustrates the GPC analysis of P(Z-Lys). The $^1$H NMR analysis of (FIG. 3.3B) before and (FIG. 3.3C) after deprotection of Z group (B: P(Z-Lys); C: PLys).

FIGS. 3.4A-C illustrate GPC analysis of star polymers.

FIG. 3.5 illustrates the preparation of amphiphilic polymers (PAsp-co-PSI) by ring closure reaction of PAsp (Chen, M.; Jensen, S. P.; Hill, M. R.; Moore, G.; He, Z.; Sumerlin, B. S. *Chem. Commun.* 2015, 51 (47), 9694) (each n can independently be about 5 to 50, about 50 to 100, or about 100 to 200).

FIG. 3.6 illustrates Scheme 3: proposed drug release from nanocarriers and degradation of the nanocarriers.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of polymer chemistry, organic chemistry, biochemistry, horticultural sciences, microbiology, molecular biology, pharmacology, medicine, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions

"Plant" refers to trees, plants, shrubs, flowers, and the like as well as portions of the plant such as twigs, leaves, stems, branches, fruit, flowers, and the like. In a particular embodiment, the term plant includes a fruit tree such as a citrus tree (e.g., orange tree, lemon tree, lime tree, and the like).

As used herein, "treat", "treatment", "treating", and the like refer to preventing or preventing the spread of a disease (e.g., citrus greening) with a composition of the present disclosure. In addition, "treatment" includes completely or partially preventing (e.g., about 70% or more, about 80% or more, about 90% or more, about 95% or more, or about 99% or more) the transmission of a disease. "Prevent" or "preventing" as used herein, covers one or more treatments of a disease in a plant, and includes: reducing the risk of occurrence of or transmission of the disease in a plant predisposed to the disease but not yet diagnosed as infected with the disease, and the like.

Discussion

Embodiments of the present disclosure provide for compositions including polymer particles, methods of making compositions, methods of using the composition, stimuli-responsive methods of delivering agents, and the like. Embodiments of the present disclosure include the ability to deliver an agent (e.g., fertilizer, nutrients, pesticides, herbicides, antibiotics, and the like) to a location (e.g., phloem)

and releasing the agent based on a condition of the location (e.g., pH, sugar level, and the like) relative to conditions in other locations. In this way, the agent can be more efficiently delivered to the location of interest and may make the agent for effective and/or use less of the agent to achieve the desired goal.

An embodiment of the present disclosure includes compositions that include a polymer particle. In an embodiment, the polymer particle includes a polymer and an agent, where the polymer encapsulates the agent. The polymer particle can change due to a change in a condition in which the polymer particle is present. In general, the condition causes a change in the polymer particle which results in the release of the agent from the polymer. In an embodiment, the polymer particle is amphiphilic under a first condition and hydrophilic under a second condition. In the first condition the agent is encapsulated by the polymer, while in the second condition the agent is released from the polymer. As mentioned above, the condition can be a characteristic of the environment in which the polymer particle is located. In general the condition is selected so that the agent is released in the desired location. In this regard the condition in the desired location is unique relative to other locations. As discussed above, the pH and the sugar concentration in the phloem are different than in other locations in the plant. In an embodiment, the condition can be pH, sugar concentration, pressure differential, presence of other small molecules unique to the desired location (e.g. amino acids, fatty acids, organic acids), or a combination thereof. In this way, embodiments of the present disclosure can be designed based on the condition(s) for a particular plant.

In an embodiment, the polymer particle can have a largest dimension (e.g., diameter) of about 10 to 50 nm, about 5 to 30 nm, or about 30 nm or less. In an embodiment, the polymer particle can have a spherical shape or a semi-spherical shape.

In an embodiment, the agent can include a drug (e.g., penicillin, streptomycin, or oxytetracycline), nutrients (e.g., zinc, iron, or manganese), pesticides (e.g., bactericides, fungicides, or insecticides), herbicides (e.g., atrazine, Roundup, or Karmex), plant growth regulators (e.g., auxins, cytokinins, or NO), brassinosteroids or there analogues (e.g., 24-epibrassinolide or (25R)-3-hydroxy-C-homo-11-oxa-5-espirostan-12-one), and their combinations. In an embodiment, the amount of agent in a polymer particle can depend upon the size the polymer particle, the polymer, and the like. In general, the agent is about 1 to 30% weight of the polymer particle.

In an embodiment, the polymer includes a responsive monomer unit and optionally a hydrophilic unit. In an embodiment, the responsive unit is hydrophobic at the first condition and is hydrophilic at the second condition. In an embodiment, the responsive unit can be responsive to: a change in the pH environment around the polymer particle from a pH of about 6 to 6.5 to a pH of about 7.0 to 8.5 (e.g., about 6 to 7, about 6 to 8, about 6.5 to 7, about 6.5 to 8.5, about 6 to 8, about 6.5 to 8, and the like) and changes the polymer particle from hydrophobic to hydrophilic, a change in the sugar level around the polymer particle from about 1 mM to about 10 mM or more and changes the polymer particle from hydrophobic to hydrophilic, or a combination thereof. In an embodiment, the polymer particle includes two or more different types of responsive units. In this regard, one responsive unit is responsive to one condition while a second responsive unit is responsive to another condition. In another embodiment, the polymer particle includes two different responsive units and are each responsive to the same condition.

In an embodiment the responsive unit can acidic or basic moieties that transition from charged to neutral upon a change in pH, sugar level, and the like. In an embodiment the responsive unit can include moieties based on carboxylic acid, boronic acids, primary amines, secondary amines, and tertiary amines. In an embodiment the responsive unit can be a polypeptide (e.g., polysuccinimide derived from aspartic acid) or a polypeptide derivative or a degradable polymer such as a polyester or polyester derivative. In an embodiment the responsive unit includes succinimide moiety(s), amino group(s), carboxylate group(s), or a combination thereof, when the responsive condition is pH.

In an embodiment the responsive unit is succinimide (e.g., polysuccinimide), which can be formed from polycondensation of aspartic acid or through ring-opening polymerization of a protected α-amino acid N-carboxyanhydride (NCA) and subsequent deprotection and post-polymerization modification to yield controlled molecular weight PSI-based copolymers. PSI is relatively hydrophobic, but it is readily hydrolyzed to hydrophilic polyaspartate (PASPA) at elevated pH. In an embodiment the responsive unit can be a linear, star, or branched polypeptide. The molecular weight can be about 1,000 to 100,000. Additional details for forming the responsive unit are described in Example 1 and Example 2.

In an embodiment where the responsive unit includes succinimide moieties, the succinimide ring opens at a pH above about 7, so that the polymer particles is amphiphilic at a pH of less than 7 and changes to hydrophilic above 7 when the ring open. So a change in the pH condition can cause the ring to open so the polymer particle becomes hydrophilic and the encapsulated agent is released from the polymer particle.

In an embodiment the responsive unit includes boronic acid moieties, amino groups, carboxylate groups, or a combination thereof, when the responsive condition is sugar. In an embodiment where the responsive unit includes boronic acid moieties, the boronic acid is hydrophobic at low pH and when unbound to diols (e.g., sugar). At elevated pH and increased concentrations of diols, the boronic acids bind to the diols and become hydrophilic. So a change in sugar concentration can cause the boronic acid to become hydrophilic, rendering the entire polymer hydrophilic, and releasing the encapsulated agent from the polymer particle.

In an embodiment, the hydrophilic groups can be incorporated by reacting polysuccinimide with primary amines that contain neutral hydrophilic alkyl chains, including short alkyl groups (e.g., methyl, ethyl) or ethoxy units, anionic hydrophilic substituents with carboxylate, sulfonate, phosphonate, boronate groups, or cationic hydrophilic groups with, for example, protonated tertiary amino groups or quaternary amino groups. In an embodiment the hydrophilic unit includes carboxylate moieties, amide moieties, amine moieties, or a combination thereof. In an embodiment the hydrophilic unit can be formed by reacting polysuccinimide with a primary amine or by hydrolysis. In this way the responsive unit and the hydrophilic unit can be formed from a single polymer. Additional examples are provided in Examples 1 and 2.

In an embodiment, the polymer particle can include other agents bound to moieties (e.g., carboxylate moieties) of the polymer. For example, cationic nutrients (e.g., $Zn^{2+}$, $Mg^{2+}$, $Ca^{2+}$, and combinations thereof) can be bound to the anionic moieties and released when the agents are released (e.g., transition from amphiphilic to hydrophilic).

In an embodiment, the polymer particle can be a star polymer or have a star polymer structure or architecture. In an embodiment, the star polymer structure has a core (the responsive unit) and a plurality of arms (e.g. about 3 to 50 arms) extending from the core. In an embodiment, the core and the arms are made of different units, where the core serves the purpose of encapsulating an active compound (e.g., antibiotic, fertilizer, nutrient) and allowing its release upon exposure of the polymer to a specific stimulus present within the plant and the arms serve the purpose of providing a hydrophilic shell that promotes water-solubility and transport into and within the plant. In an embodiment, the core can be hydrophobic. In addition, the star polymer is not agglomerated. In an embodiment, the core can be selected from: a lysine moiety, an aspartic acid moiety, a glutamic acid moiety, a tyrosine moiety, a serine moiety, a cysteine moiety, or other functional amino acid moieties. In an embodiment, the arms can be selected from: an aspartic acid moiety, a lysine moiety, an aspartic acid moiety, a glutamic acid moiety, a tyrosine moiety, a serine moiety, a cysteine moiety, or other functional amino acid moieties.

In an embodiment, the polymer star would encapsulate hydrophobic compounds within their hydrophobic interior and release these compounds as the hydrophobic interior transforms to become hydrophilic at the higher pH or higher sugar in the phloem, for example. One benefit of the star polymer is that the encapsulation would not require intermolecular aggregation of several polymer chains to form the hydrophobic environment needed to encapsulate the active compounds. This sort of intermolecular aggregation makes control of particle size more difficult, which is a primary concern when designing nanocarriers for agriculture to allow transport across the cell wall. Polymer stars can be designed with precise dimensions such that their size is controlled during synthesis by the length of their backbone and arms. Because they do not rely on aggregation between multiple stars (their hydrophilic exterior prevents aggregation), the size of the delivery nanoparticle can be readily dictated a priori.

In an embodiment, the polymer particle has a star polymer structure, where the dimensions of the polymer particle can be designed. For example, the star polymer structure can have a dimension of about 10 to 50 nm, about 5 to 30 nm, or about 30 nm or less.

Another advantage of the star polymer architecture as compared to polymeric nanoparticles based on intermolecular aggregation of multiple chains is that star polymers may be more readily rehydrated after drying, resulting nanoparticle sizes that are similar to those of the stars prior to drying. This could allow the loaded nanoparticles to be shipped and stored as a dry product that could be rehydrated by the end user prior to application to the plant.

An embodiment of the present disclosure includes exposing (e.g., injection, spraying, watering, and the like) a plant to a composition including a polymer particle. Once the polymer particle reaches the desired location that has the condition (e.g., pH, sugar concentration, and the like) that the responsive unit of the polymer particle is responsive to, the agent is released from the polymer particle so that the plant is exposed to the agent. In this regard polymer particles of the present disclosure can be used to treat plants to prevent disease or condition caused by an insect or exposure to an insect or chemical, kill the disease or condition, relieve symptoms of the disease or condition, or the like.

Specifically, photosynthates are transported from the leaves to the rest of the plant primarily though the phloem. As a result, a composition including the agent can be delivered to the phloem, where in response to a certain condition in the phloem, the agent is released from the composition and into the phloem. The triggering condition in the phloem can include the pH or the sugar concentration. For example, the pH in the phloem (e.g., about 7-8.5) is higher than in other locations (e.g., xylem (pH of about 5-6), cell wall, vacuoles) in the plant. In another example, the sugar concentration in the phloem is higher than in other locations in the plant. As a result, the pH change, the sugar concentration change, or both, can be used as a condition to release the agent from the composition. In general, the condition causes a change in the polymer particle (e.g., change it from amphiphilic to hydrophilic) which results in the release of the agent. In this regard, the agent could be efficiently delivered to the plant. For example, citrus greening disease is limited to a phloem pathogen so release of the agent effective against this pathogen in the phloem can be more effective, or less agent is needed to combat the pathogen. In addition, the agent can be released in the leaves, which may be advantageous for treating diseases in the leaves or that originate in the leaves or for releasing agents that can inhibit or repel insects.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

EXAMPLE

Example 1

We report the synthesis and characterization of pH-responsive polysuccinimide-based nanoparticles. Polysuccinimide (PSI), a precursor to biodegradable poly(aspartic acid), was synthesized from the condensation of L-aspartic acid and subsequently functionalized with primary amines to form random amphiphilic copolymers. The copolymers formed stable nanoparticles in aqueous medium via nanoprecipitation and were subsequently loaded with a model hydrophobic molecule to demonstrate their potential as controlled-release delivery vehicles. It was found that above pH 7, the hydrophobic succinimidyl units of the PSI-nanoparticles hydrolyzed to release encapsulated materials. The release rate significantly increased at elevated pH and decreased with increasing degree of functionalization. Finally, plant toxicity studies showed that the polymer materials exhibit little to no toxic effects at biologically relevant concentrations.

INTRODUCTION

Although pH-responsive materials have been extensively studied in the realm of medicine, less attention has been given to the application of these adaptive materials in agriculture.[1-3] However, use efficiency of fertilizers remains low even in modern agriculture, and pesticides often fail to kill pathogens, as only a small portion of the effective compounds ever reach their targeted sites.[4-6] Despite the relative lack of attention in agricultural sciences, responsive polymeric nanoparticles have significant potential to enhance the delivery efficacy of pesticides, nutrients, and drugs, which can in turn provide valuable benefits to help cure deadly plant diseases.[7-11] Specific delivery to the phloem, the vascular tissue in plants that aids in the transport of nutrients and photosynthates, is desirable not only because of its critical role in carrying nutrients, but also because many plant pathogens reside in the phloem (i.e. phloem-limited pathogens) and are responsible for numerous deadly crop diseases, such as citrus huanglongbing (HLB).[12] While most plant tissue exists in a slightly acidic environment, the phloem exhibits a higher, slightly alkaline pH.[13] Thus, much like pH-responsive nanoparticles designed to exploit the low pH of cancer cells, a nanodelivery system designed to respond to the higher pH of the phloem may be useful for site-specific delivery in plants, thereby potentially enhancing the use efficiency of delivered components.

Many fundamental questions arise when applying stimuli-responsive polymers for delivery in plants. For instance, additional consideration must be given to how the nanoparticles enter plant cells and are subsequently transported to targeted sites. As opposed to a cell membrane, which takes in materials of various sizes by endocytosis, plants possess a cell wall, which is more ordered and exhibits specific pore diameters of ~30 nm.[14] Therefore, it is important to carefully control the size of polymer nanoparticles so that they can readily pass through the cell wall and reach the plasma membrane. Once in the plasma membrane, the loaded nanoparticles can be further transported to the targeted sites along apoplastic and symplastic pathways by diffusion or electrochemical gradients.

Given the lack of an excretory system in plants, the fate of materials used for such applications is another important concern. While the most well-known and studied pH-responsive polymers (e.g., poly((meth)acrylic acid), poly(N, N-dimethylaminoethyl(meth)acrylate)) have proven effective in a number of physiological applications, they typically contain non-degradable all-carbon backbones, which limits their use in plants. Therefore, since biodegradability is of utmost importance for delivery to plants to reduce concerns about environmental fate and sustainability, new types of stimuli-responsive biodegradable materials are needed.[1,15,16] The construction of nanoparticles suitable for delivery to plant phloem thus becomes more complicated. The nanoparticles must be (i) responsive to the basic pH found in the phloem, (ii) small enough to enter the plant cell through cell wall junctions, and (iii) biodegradable to reduce accumulation over time. Additionally, these nanoparticles would ideally be equipped with moieties to facilitate transport along electrochemical gradients and, most importantly, capable of encapsulating guest compounds including hydrophobic, and even hydrophilic small molecules or drugs.

Polysuccinimide (PSI) has attracted attention for many years due to the biodegradable and hydrophilic nature of its derivatives, namely poly(aspartic acid) (PASP) and poly (hydroxyethylaspartimide) (PHEA).[17-23] PSI is derived from the ring closing condensation polymerization of L-aspartic acid. Subsequent hydrolysis of the polymeric repeat units under mildly basic conditions results in the hydrophilic derivative, PASP, with both α and β ring-opened units (FIG. 1.1).[24] The biodegradability of PASP derived from the hydrolysis of PSI has been previously documented, although longer degradation periods compared to other poly(amino acids) was necessary, which is likely due to the presence of a mix of L- and D-aspartic acid units as well as the β-hydroxyl structures in the backbone.[19,25-27] Nevertheless the degradation is still expected to progress compared to polymers prepared radically with polymethylene backbones.

Because of the reactivity of PSI toward primary amines, there have been many reports of incorporating various moieties onto the PSI backbone, which open the succinimidyl ring to give fully functionalized PASP-derivatives,[28-30] or, often, PSI is partially functionalize with various nucleophiles and the remaining succinimidyl units are subsequently hydrolyze to give PASP copolymers.[31,12] Additionally, many groups have incorporated stimuli-responsive moieties onto the PSI backbone, (i.e., hydrazone bonds,[29,33-35] amines,[20,36,37] thiols and disulfides,[38-40] carboxyls,[31,41] imidazole,[42] etc.) to impart responsiveness onto the biodegradable PASP backbone.

We, however, are interested in exploring the inherent pH-responsive nature of PSI. Because PSI hydrolyzes at elevated pH to form water-soluble and biodegradable PASP, we envisioned employing PSI as a potential platform for the development of a site-specific delivery system for agricultural applications. Thus, utilizing PSI as our pH-responsive and hydrophobic scaffold, we aimed to prepare a nano-sized delivery system to capitalize on the higher pH of the phloem (FIG. 1.2). Our approach includes partially functionalizing the backbone of PSI to form self-assembled nanoparticles and relying on the hydrolytic lability of the remaining succinimidyl groups for stimuli-responsiveness. While PSI is not water-soluble at neutral pH, its succinimidyl groups hydrolyze at elevated pH to yield derivatives of water-soluble PASP.[43] This pH-driven solubility transition may provide a convenient mechanism to induce supramolecular dissociation of PSI-based polymeric assemblies. Therefore, we reasoned that this transition in solubility could be exploited to allow PSI-based polymers to serve as a platform for site-specific, pH-responsive guest molecule release. Moreover, because the resulting PASP-based copolymers are known to be biodegradable, the change in water-solubility may simultaneously increase the degradation rate of the polymeric byproduct. Although previous reports have utilized PSI as a precursor for the development of stimuli-responsive (co)polymer materials, to our knowledge the inherent pH-responsiveness of PSI itself has yet to be investigated.

Herein, we describe the synthesis of random amphiphilic copolymers by the partial functionalization of PSI with primary amines and subsequent nanoprecipitation to form pH-responsive nanoparticles. Three PSI-based copolymers were studied. These three copolymers had structures that were achieved by partially reacting the succinimidyl units of PSI with hexylamine (HA) or 2-amino(ethoxy)ethanol (2AEE) or by partial hydrolysis with NaOH. We demonstrate nanoparticle sizes can be readily controlled by precipitation conditions, and that particles small enough for delivery to plant phloem are possible. The nanoparticles were loaded with a model hydrophobic compound that could be triggered to release upon exposure to alkaline pH, demonstrating the potential for site-specific and condition-specific delivery in agriculture. Furthermore, the PSI-based copolymers showed limited toxicity to plant tissue under biologically relevant concentrations, suggesting these materials are a viable option for agricultural drug delivery systems.

Materials and Methods Materials. L-Aspartic acid (98%), o-phosphoric acid (85%), hexylamine (99%), 2-(2-amino-ethoxy)ethanol (98%), and Nile red were purchased from Sigma-Aldrich. Potassium phosphate monobasic (Fisher) was used to prepare 0.1 M phosphate buffers with adjusted pH for release studies. Murashige and Skoog basal salt mixture (MS salts) purchased from Phytotechnology Laboratories, benzyl adenine (BA), myo-inositol, claforan (cefotaxime) and a plant cell viability assay kit were obtained from Sigma-Aldrich. All organic solvents were used as received.

Characterization. $^1$H NMR spectroscopy was performed using a Varian Mercury 300 or Varian Inova 500 spectrometer with deuterated dimethyl sulfoxide (DMSO-d$_6$) as the solvent. Molecular weight and polydispersity were determined by size exclusion chromatography (SEC) in N,N-dimethylacetamide (DMAc) with 50 mM LiCl at 50° C. and a flow rate of 1.0 mL min-1 (Agilent isocratic pump, degasser, and autosampler, columns: PLgel 5 µm guard+two ViscoGel I-series G3078 mixed bed columns: molecular weight range 0-20×10$^3$ and 0-100×10$^4$ g mol-1). Detection consisted of a Wyatt Optilab T-rEX refractive index detector operating at 658 nm and a Wyatt miniDAWN Treos light scattering detector operating at 659 nm. Absolute molecular weights and polydispersities were calculated using the Wyatt ASTRA software. Transmission electron microscopy (TEM) was conducted with a Hitachi H7000 microscope operating at 100 kV. A freshly glow discharged (Pelco easiGlow™, Ted Pella, Inc.) Formvar coated 200-mesh Cu grid was placed on a 0.1 mg/mL drop of solution for 30 seconds. The grid was dried and stained with 0.5% aqueous uranyl acetate solution. Dynamic light scattering (DLS) analysis was conducted at room temperature on a Zetasizer Nano-ZS (Malvern) operating at a wavelength of 633 nm. UV-Vis and fluorescence spectroscopy measurements were taken on a Molecular Devices SpectraMax M2 Multimode Microplate reader with $\lambda_{excitation}$=530 nm and $\lambda_{emission}$=650 nm.

Synthesis of polysuccinimide (PSI). Polysuccinimide was prepared as previously reported.[18,29] Briefly, L-aspartic acid (20 g, 0.15 mol) and phosphoric acid (10 g, 0.10 mol) were added to a 500 mL round bottom flask. The reaction vessel was placed under nitrogen and heated to 180° C. while stirring for 2 h. The product was dissolved in N,N-dimethylformamide (DMF, 100 mL) and precipitated into cold methanol. The product was then collected via vacuum filtration and washed with additional methanol and water to remove any remaining DMF.

Preparation of functionalized nanoparticles. The nucleophile (HA, 2-AEE, or NaOH) was added to a solution of PSI dissolved in DMF and stirred at room temperature overnight. The functionalized copolymer was then added dropwise to a beaker of stirring deionized water. For example, for a copolymer functionalized with 20% HA (20% PSI-HA), PSI (498 mg, 5.15 mmol) was dissolved in DMF (5 mL) and HA (0.13 mL, 1.0 mmol) was added drop-wise to the solution. The solution was stirred at room temperature overnight and precipitated into deionized water (200 mL). The aqueous nanoparticle solution was transferred to dialysis tubing (Spectra/Por, MWCO=3500 Da) and placed in deionized water, which was replenished daily for one week.

Loading and release of Nile red. A solution of Nile red dissolved in acetone was added to an aliquot of nanoparticle solution and stirred for several hours (1:1 weight ratio of dye to polymer). The acetone was allowed to evaporate freely from the solution, and any unencapsulated Nile red was removed by filtration. Loading efficiency was calculated via fluorescence spectroscopy using a calibration curve of Nile red in DMF. Loaded samples were freeze-dried and dissolved in DMF before measuring. Similarly, loading capacity was defined as $$LC\% = 100 * \frac{M_{encapsulated}}{M_{system}},$$

where $M_{encapsulated}$ is the mass of dye encapsulated $M_{system}$ by the nanoparticles, and $M_{system}$ represents the mass of the nanoparticle solutions. To study the release of Nile red, the nanoparticle solutions were placed in 0.1 M phosphate buffers of varying pH. The fluorescence of the solutions was monitored with $\lambda_{excitation}$=530 nm and $\lambda_{emission}$=650 nm over 72 h.

Preparation of germination medium for plant toxicity assay. MS salts (2.15 g), myo-inositol (50 mg), FM stock (1.865 g $Na_2$EDTA, 1.390 g $FeSO_4·7H_2O$ into 500 mL; 5 mL), and sucrose (15 g) were added to an autoclaved beaker. The solution pH was adjusted to 5.7, and the volume was brought to 1 L. Agar (7 g) was added to the medium and heated for 30 min to obtain the final germination medium.

Preparation of citrus seeds. Germination medium (12 mL) was dispensed into autoclaved culture tubes. Healthy and viable citrus seeds from grapefruit (*Citrus paradisi*) and sweet orange (*Citrus sinensis*) were selected, and the outer seed coats were removed. Seed kernels were kept moist at all times. Each seed was placed in a sterile autoclaved beaker with a stir bar and stirred in 300 mL of the following solutions for the indicated time intervals: 70% alcohol (2 min), 10% sodium hypochlorite (10 min), and three sterile DI water rinses (2 min).

Culture of citrus seeds. One seed was inserted into each germination medium-filled culture tube. The test tube racks were wrapped with plastic wrap and doubly wrapped with aluminum foil to minimize light exposure. Finally, the test tube racks with seeds were placed on the bottom of a growth chamber for 5 weeks, when the etiolated seedlings were used for toxicity screening.

Preparation of MSBC medium. MS salts (4.3 g), myo-inositol (100 mg), GM stock (20 mg Glycine, 50 mg Nicotinic Acid, 100 mg Pyridoxine HCl, 100 mg Thiamine HCl into 500 mL; 10 mL), sucrose (30 g), and BA (2 mg) were dissolved in DI water. The pH of the solution was adjusted to 5.7, and additional DI water was added to bring the volume to 1 L. Agar (8 g) was added and the solution was autoclaved for 25 min. After cooling, 1 mL of filtered and sterilized (500 mg/mL) Claforan stock was added to obtain 500 µg/mL MSBC medium. The medium was dispensed into sterilized culture dishes, and different concentrations of polymers were added before solidification when the MSBC media was in liquid phase near room temperature.

Toxicity assessment by tissue culture. Citrus plants were cut into 1-2 cm segments and placed on appropriate MSBC medium-filled culture dish. The dishes were then put into a growth chamber with 12 h of alternating light and dark for 21 days. Alive and dead segments were counted after 8 and 21 days.

Results and Discussion

Synthesis of amphiphilic PSI copolymers and nanoparticle formation. PSI was synthesized by acid-catalyzed condensation polymerization of L-aspartic acid ($M_n$=13,500, $M_w/M_n$=1.52).[24,43] The resulting polymer was partially functionalized by reaction with N-alkyl primary amines or via partial hydrolysis with NaOH to yield amphiphilic PSI derivatives (FIG. 1.3). The resulting polymers were dissolved in DMF and precipitated into water to form stable polymeric nanoparticles. A carefully controlled balance of hydrophilic and hydrophobic character was required to obtain PSI-based polymers capable of assembling in aqueous media to form PSI-based nanoparticles, as previously demonstrated.[44,45]

We first explored the functionalization of PSI with 2-amino(ethoxy)ethanol (2AEE). The degree of functionalization for all of the copolymers was determined by $^1$H NMR spectroscopy by comparing the backbone succinimidyl proton (—CHCON—) (5.2 ppm) to the shift of the backbone methine proton on the opened PASP unit (4.5 ppm) (FIG. 1.4). We found that incorporation of more than 5 mol % 2AEE rendered the entire polymer chain hydrophilic to the extent that it was completely water-soluble and unable to form nanoparticles. Similarly, PSI modified by partial hydrolysis of the succinimidyl units by titrating the dissolved polymer with low mol % NaOH also showed that hydrolysis greater than 5 mol % led to a completely water-soluble polymer that did not assemble into nanoparticles. However, amphiphilic copolymers were readily accessible by limiting the functionalization of 2AEE (PSI-2AEE) or NaOH hydrolysis (PSI-PASP) to less than 5 mol %. We hypothesized that the incorporation of hydrophilic moieties in the functionalizing agent and the concomitant increase in hydrophilicity of the backbone unit as hydrophobic succinimide units were converted to hydrophilic aspartamide/aspartic acid units could be responsible for the increased solubility observed at this low degree of functionalization. Therefore, we reasoned that it might be possible to tune the amphiphilicity of PSI by partial functionalization with hydrophobic amines, relying only on ring opening of succinimidyl units to impart hydrophilicity.

To explore higher degrees of functionalization, we employed hexyl amine (HA) to modify PSI. The more hydrophobic nature of HA compared to 2AEE allowed the preparation of amphiphilic copolymers from 1-100% functionalization.[44] Both the degree of functionalization and the solution concentration of the copolymers prior to precipitation were explored as variables for controlling nanoparticle size. Contrary to previous reports,[44] we found little to no relationship between the degree of functionalization and nanoparticle size (FIG. 1.5). However, nanoparticle size was dependent on the concentration of the copolymer solution, with smaller nanoparticles being formed as the solution became more dilute, as determined by DLS and TEM analysis (FIGS. 1.6A-C). While previous methods have been used to prepare PASP nanoparticles of diameters>100 nm,[46, 47] we found using precipitation concentrations of ~20 mg/mL and below produced nanoparticles of diameters≤30 nm, which may potentially enable nanoparticles of this type to diffuse through the cell wall of plant cells.

Additionally, copolymers functionalized with both HA (15 mol %) and partially hydrolyzed with NaOH (1 mol %) were capable of forming stable nanoparticles. The presence of the carboxylate groups on the nanoparticle surface was supported by zeta potential measurements. While the control 15% PSI-HA exhibited a zeta potential of 0.0 mV (0.54), the partially hydrolyzed 15% PSI-HA nanoparticle revealed a zeta potential of −33.0 mV (1.9) (FIG. 1.7) (pH=4.5). Incorporating carboxylate groups into the nanoparticle shell could possibly be valuable for chelating water-soluble nutrients or facilitating the nanoparticle transport along electrochemical gradients present within plant tissues.

Loading of model hydrophobic molecule. With the method of generating stable nanoparticles of controlled size determined, we next sought to evaluate the capacity of the nanoparticles to store and release hydrophobic molecules. Nile red, a hydrophobic dye that served as a model active compound,[48] was dissolved in acetone and added to an aqueous solution of PSI nanoparticles. After stirring in an open vessel to allow the evaporation of acetone, unencapsulated dye was removed by filtration, leaving a transparent purple solution of dye-loaded nanoparticles. TEM and DLS showed that the dye loading did not significantly alter the nanoparticle size or shape (FIGS. 1.8A-C). The difference in absorption maximum was observed from 540 to 575 nm for the nanoparticles, with the variations depending on the hydrophobic environment of each nanoparticle, as has been noted in the literature.[49] For example, PSI-HA nanoparticles with 5, 50, and 100% functionalization gave absorption maximums of 575, 560, and 555 nm respectively. To determine loading capacity, the solutions of Nile red-loaded nanoparticles were freeze-dried and dissolved in DMF to release all encapsulated dye. A calibration of the fluorescence of Nile red in DMF at varying concentrations allowed the concentration of dye to be calculated for each nanoparticle solution (FIGS. 1.8A-C). The loading capacity of nanoparticles with various sizes and functionalization ranged from 1-25 w % with the initial ratio of dye:polymer=1:1 (w/w %) (Table 1.1).

TABLE 1.1

Nanoparticle diameter and loading capacity of Nile red

| Copolymer | $D_h{}^a$ [nm] | $PDI^b$ | Loading capacity$^c$ [%] |
|---|---|---|---|
| 1% PSI-HA (PSI$_{137}$-co-(PSI-HA)$_2$) | 37 | 0.25 | 7.3 |
| 1% PSI-PASP (PSI$_{137}$-co-PASP$_2$) | 65 | 0.20 | 24 |
| 1% PSI-2AEE (PSI$_{137}$-co-(PSI-2AEE)$_2$) | 27 | 0.30 | 12 |
| 5% PSI-HA (PSI$_{132}$-co-(PSI-HA)$_7$) | 27 | 0.27 | 9.8 |
| 10% PSI-HA (PSI$_{125}$-co-(PSI-HA)$_{14}$) | 29 | 0.24 | 12 |
| 30% PSI-HA (PSI$_{97}$-co-(PSI-HA)$_{42}$) | 78 | 0.12 | 6.1 |
| 50% PSI-HA (PSI$_{70}$-co-(PSI-HA)$_{69}$) | 83 | 0.11 | 20 |
| 100% PSI-HA (PSI-HA)$_{139}$ | 75 | 0.16 | 4.8 |
| 10% PSI-HA (PSI$_{125}$-co-(PSI-HA)$_{14}$) | 83 | 0.39 | 16 |
| 10% PSI-HA (PSI$_{125}$-co-(PSI-HA)$_{14}$) | 8 | 0.31 | 33 |

$^a$Hydrodynamic diameter as measured by DLS (Z-Avg).
$^b$Polydispersity index.
$^c$Loading capacity ((grams Nile red/grams polymer) × 100).

Nanoparticle Response to Alkaline pH and Release of Nile Red. To study the pH-responsiveness and the drug release of the PSI-based nanoparticles, the loaded nanoparticles were exposed to buffered solutions, and the change in fluorescence intensity was monitored over 72 h. Because Nile red is hydrophobic in water and therefore only fluoresces within the hydrophobic interior of the nanoparticle, fluorescence is expected to decrease as the succinimidyl units are hydrolyzed and the nanoparticles disassemble to release the dye. While the hydrolysis of PSI under basic conditions is well known, we expected some hydrolysis would still occur under neutral conditions, albeit at a reduced rate. We thus first explored the hydrolysis kinetics at various pH values with 1% PSI-2AEE. As expected, the release rate was rapid at pH 8.5 and 8 due to the hydrolysis of the succinimidyl backbone of the PSI units, with approximately 80 and 60%, respectively, of the dye being released at 30 h. On the other hand, PSI is more stable under neutral and acidic conditions; therefore at pH 7 and 6 there was less than 40 and 20%, respectively, dye released over 72 h (FIG. 1.9A).

Release studies also showed that the functionalizing moiety (2AEE, HA, NaOH) did not significantly affect the release rate (FIG. 1.10), but incorporating high degrees of functionality, in the case of PSI-HA, slowed the release rate or prevented nanoparticle disassembly, with minimal release being observed under alkaline environments (FIG. 1.9B). We hypothesize that the hydrophobicity of the hexyl chains kept the copolymer sufficiently amphiphilic to maintain nanoparticle stability, even after complete hydrolysis. Greater than 15% functionalization with HA appeared to render the material sufficiently hydrophobic to prevent disassembly and any dye release. Lastly, a copolymer of 10%

PSI-HA was precipitated at different concentrations to produce nanoparticles of varying sizes (13, 28, and 83 nm). The release at pH 8.5 suggested hydrolysis was slightly faster with smaller sized nanoparticles (FIG. 1.9C), which is potentially due to the increased surface area. Although a small amount of hydrolysis occurs at neutral pH, almost no hydrolysis occurs in acidic environments. Because plant tissue is slightly acidic (pH~5-6) except in the phloem (pH~8), the nanoparticles offer considerable promise for site-specific delivery in agricultural applications.

Plant Toxicity. To evaluate any possible toxicity of the polymers toward plant tissue, a method was developed using living plant tissue. Citrus seeds were planted on germination medium and were cultured in the dark at 25° C. for five weeks, until the seedling reached the length of the culture tube. Each seedling was then cut into fragments and seeded on plates filled with MSBC medium with varying concentrations of the polymers (PASP, PSI, and PSI-HA) (FIGS. 1.11A-C). The plates were then put into a growth chamber with alternating 12 h lighting cycles and analyzed after 8 and 21 days to determine the percent of living tissue (FIG. 1.12). As shown in FIG. 1.12, PASP, PSI, and PSI-HA showed limited toxicity up to concentrations of 196 µg/mL. While extremely high concentrations of PSI and PSI-HA showed toxicity (0% tissue viability at 385 µg/mL PSI-HA), PASP at 385 µg/mL showed no toxicity. It should be noted that although PASP dissolved easily in the MSBC medium, the more hydrophobic PSI homopolymer and PSI-HA copolymer required DMSO to fully dissolve into the medium, which may have influenced the results of the toxicity assays for these (co)polymers at high concentrations. Nevertheless, the relatively low toxicity of the PSI-based polymers to plant tissue provides further evidence of their promising potential for future applications in agriculture.

Conclusions

Responsive nanoparticles were developed to capitalize on the higher pH of plant phloem for the design of a site-specific delivery system to plants. Amphiphilic copolymers based on PSI were synthesized by functionalization with various amines that provided a convenient means to tune the hydrophilic-hydrophobic balance needed for nanoparticle formation. Controlling the degree of functionalization and nanoprecipitation conditions proved to be viable methods of programming nanoparticle size, which could prove useful when developing new systems for delivery applications. The nanoparticles were loaded with a model hydrophobic drug and showed controlled release at alkaline pH, with increased rates at higher pH of the solution and lower degrees of functionalization. Lastly, the toxicity of the polymers was tested on plant tissue, with only minimal toxicity being observed at reasonable concentrations of the polymers.

REFERENCES, EXAMPLE 1

(1) Gao, W.; Chan, J. M.; Farokhzad, O. C. *Mol. Pharmaceutics* 2010, 7, 1913-1920.
(2) Trivedi, R.; Kompella, U. B. *Nanomedicine* 2010, 5, 485-505.
(3) Puoci, F.; Iemma, F.; Spizzirri, U. G.; Cirillo, G.; Curcio, M.; Picci, N. *American Journal of Agricultural and Biological Sciences* 2008, 3, 299-314.
(4) Syers, J. K.; Johnston, A. E.; Curtin, D. *Fertilizer and Plant Nutrition Bulletin* 2008, 18-18.
(5) Baligar, V. C.; Fageria, N. K.; He, Z. L. *Commun. Soil Sci. Plan.* 2001, 32, 921-950.

(6) Raun, W. R.; Johnson, G. V. *Agron. J.* 1999, 91, 357-363.

(7) Bhattacharyya, A.; Bhaumik, A.; Rani, P. U.; Mandal, S.; Epidi, T. T. *Afr. J. Biotechnol.* 2010, 9, 3489-3493.

(8) Chinnamuthu, C. R.; Boopathi, P. M. *Madras Agricultural Journal* 2009, 96, 17-31.

(9) Pérez-de-Luque, A.; Rubiales, D. *Pest. Manag. Sci.* 2009, 65, 540-545.

(10) Yang, J.; Dong, C.; Dong, Y.; Liu, S.; Pan, L.; Zhang, C. *ACS Appl. Mater. Interfaces* 2014, 6, 14486-14492.

(11) Zhang, C.; Ma, J.; Yang, J.; Inaki Schlaberg, H.; Liu, S.; Xu, J. *Appl. Phys. Lett.* 2013, 103, 093106.

(12) Bove, J. M.; Garnier, M. *Plant Sci* 2002, 1083-1098.

(13) Mendoza-Cózatl, D. G.; Butko, E.; Springer, F.; Torpey, J. W.; Komives, E. A.; Kehr, J.; Schroeder, J. I. *Plant J.* 2008, 54, 249-259.

(14) Fleischer, A.; O'Neill, M. A.; Ehwald, R. *Annu. Rev. Plant Physiol.* 1999, 121, 829-838.

(15) Alarcón, C. de L. H.; Pennadam, S.; Alexander, C. *Chem. Soc. Rev.* 2005, 34, 276-285.

(16) Murthy, N.; Campbell, J.; Fausto, N.; Hoffman, A. S. *J. Control. Release* 2003, 89, 365-374.

(17) Kumar, A. *Che. Sci. Rev. Lett.* 2012, 1, 162-167.

(18) Moon, J. R.; Kim, B. S.; Kim, *J. Bull. Korean Chem. Soc.* 2006, 27, 981-985.

(19) Thombre, S. M.; Sarwade, B. D. *J. Macromol. Sci. A* 2005, 42, 1299-1315.

(20) Gu, X.; Wang, J.; Liu, X.; Zhao, D.; Wang, Y.; Gao, H.; Wu, G. *Soft Matter* 2013, 9, 7267.

(21) Jeong, J. H.; Cha, C.; Kaczmarowski, A.; Haan, J.; Oh, S.; Kong, H. *Soft Matter* 2012, 8, 2237.

(22) Lai, M.-H.; Lee, S.; Smith, C. E.; Kim, K.; Kong, H. *ACS Appl. Mater. Interfaces* 2014, 6, 10821-10829.

(23) Ma, Y.; Jiang, X.; Zhuo, R. *J. Polym. Sci. A Polym. Chem.* 2013, 1771-1780.

(24) Wang, Y.; Hou, Y.; Ruan, G.; Pan, M.; Liu, T. *J. Macromol. Sci. A* 2003, 40, 293-307.

(25) Alford, D. D.; Wheeler, A. P.; Pettigrew, C. A. *J. Environ. Polym. Degr.* 1994, 2, 225-236.

(26) Roweton, S.; Huang, S. J.; Swift, G. *J. Environ. Polym. Degr.* 1997, 5, 175-181.

(27) Nakato, T.; Yoshitake, M.; Matsubara, K.; Tomida, M.; Kakuchi, T. *Macromolecules* 1998, 31, 2107-2113.

(28) Li, L.; Wu, J.; Zhao, M.; Wang, Y.; Zhang, H.; Zhang, X.; Gui, L.; Liu, J.; Mair, N.; Peng, S. *Chem. Res. Toxicol.* 2012, 25, 1948-1954.

(29) Wang, X.; Wu, G.; Lu, C.; Zhao, W.; Wang, Y.; Fan, Y.; Gao, H.; Ma, *J. Eur. J Pharm. Sci.* 2012, 47, 256-264.

(30) Lai, M.-H.; Jeong, J. H.; DeVolder, R. J.; Brockman, C.; Schroeder, C.; Kong, H. *Adv. Funct. Mater.* 2012, 22, 3239-3246.

(31) Xu, M.; Zhao, Y.; Feng, M. *Langmuir* 2012, 28, 11310-11318.

(32) Wang, Y.; Xue, M.; Wei, J.; Li, C.; Zhang, R.; Cao, H.; Yang, J.; Tan, T. *RSC Adv.* 2012, 2, 11592.

(33) Lu, C.; Wang, X.; Wu, G.; Wang, J.; Wang, Y.; Gao, H.; Ma, J. *J. Biomed. Mater. Res. A.* 2013, 102, 628-683.

(34) Lu, C.; Li, B.; Liu, N.; Wu, G.; Gao, H.; Ma, J. *RSC Adv.* 2014, 4, 50301-50311.

(35) Lee, M.; Jeong, J.; Kim, D. *Biomacromolecules* 2015, 16, 136-144.

(36) Moon, J. R.; Kim, M. W.; Kim, D.; Jeong, J. H.; Kim, J.-H. *Colloid. Polym. Sci.* 2010, 289, 63-71.

(37) Némethy, Á.; Solti, K.; Kiss, L.; Gyarmati, B.; Deli, M. A.; Csányi, E.; Szilágyi, A. *Eur. Polym. J.* 2013, 49, 2392-2403.

(38) Gyarmati, B.; Vajna, B.; Némethy, Á.; László, K.; Szilágyi, A. *Macromol. Biosci.* 2013, 13, 633-640.

(39) Zhang, G.; Liu, J.; Yang, Q.; Zhuo, R.; Jiang, X. *Bioconjug. Chem.* 2012, 23, 1290-1299.

(40) Cui, C.; Xue, Y.-N.; Wu, M.; Zhang, Y.; Yu, P.; Liu, L.; Zhuo, R.-X.; Huang, S.-W. *Macromol. Biosci.* 2013, 13, 1036-1047.

(41) Casadei, M. A.; Pitarresi, G.; Calabrese, R.; Paolicelli, P.; Giammona, G. *Biomacromolecules* 2008, 9, 43-49.

(42) Seo, K.; Kim, D. *Macromol. Biosci.* 2006, 6, 758-766.

(43) Nakato, T.; Kusuno, A.; Kakuchi, T. *J. Polym. Sci. A Polym. Chem.* 2000, 38, 117-122.

(44) Xu, W.; Li, L.; Yang, W.; Hu, J.; Wang, C.; Fu, S. *J. Macromol. Sci. A.* 2003, 40, 511-523.

(45) Chen, H.; Xu, W.; Chen, T.; Yang, W.; Hu, J.; Wang, C. *Polymer* 2005, 46, 1821-1827.

(46) Shu, S.; Zhang, X.; Teng, D.; Wang, Z.; Li, C. *Carbohyd. Res.* 2009, 344, 1197-1204.

(47) Wang, T. W.; Xu, Q.; Wu, Y.; Zeng, A. J.; Li, M.; Gao, H. *Carbohyd. Res.* 2009, 344, 908-914.

(48) Pal, S.; Ghosh Roy, S.; De, P. *Polym. Chem.* 2014, 5, 1275-1284.

(49) Greenspan, P.; Fowler, S. D. *J. Lipid Res.* 1985, 26, 781-789.

Example 2

While polymeric nanocarriers are widely used in medicine for controlled release and site-specific delivery, few reports have applied such delivery methods within agriculture, despite the urgent need for specific delivery of pesticides and nutrients. We report the synthesis of stimuli-responsive and biodegradable polymeric nanocarriers designed for delivery to the phloem of plants and describe methods employed to evaluate their toxicity in plant cells.

Due to their biocompatibility and biomimetic properties, polypeptides are widely used in medicine and biology, including drug delivery,[1] gene therapy,[2] and regenerative medicine.[3] Among the various polypeptides, poly(aspartic acid) (PASP) has often been considered because of its water-solubility and facile synthesis. PASP is typically prepared from the thermal condensation of L-aspartic acid, which leads to the precursor polymer, poly(succinimide) (PSI). PSI is a particularly useful polymer as it may be easily hydrolyzed to PASP under basic conditions or functionalized with hydrophilic amines to produce water-soluble and biocompatible PASP derivatives.[4,5] Due to its facile functionalization, response to alkaline pH, and biodegradability of its hydrolyzed products, we believe PSI holds great promise in the area of controlled delivery.[6] However, currently, the most common method for its synthesis occurs through step-growth polymerization, which leads to limited control over molecular weight, molecular weight distribution and architecture of the resulting polymer. Additionally, tuning the amphiphilicity of PSI by reacting with small molecule amines may have negative effects on the biodegradability and environmental impact of the resultant derivatized polymer.[7]

Stimuli-responsive materials have received tremendous interest for site- and rate-specific drug delivery by capitalizing on the ability to carefully construct systems capable of delivering a payload under specific microenvironment conditions. While most systems have been designed to utilize disease-site microenvironments in humans (i.e., the acidic nature of a cancerous tumor, a high concentration of $H_2O_2$ in inflamed tissue, etc.),[8] the versatility of such materials leads to applications beyond the human body. For example, plant phloem, the vascular tissue responsible for transport of photosynthates and nutrients, has a higher pH (8.0-8.5) than the surrounding plant tissue.[9] Given the low efficiency of pesticide and nutrient delivery to plants in modern agriculture,[10] a system designed to deliver effective molecules specifically to the phloem could greatly enhance use efficiency and therefore reduce the amount of pesticides and nutrients currently required to maintain agriculture productivity. Extensive research on synthetic biomaterials over the last few decades has led to clear procedures to probe the potential toxicity of such materials in the human body.[11] Given the lack of research conducted in the area of responsive materials in agriculture, guidelines to evaluate toxicity of synthetic materials to plants are lacking.

Herein, we report the synthesis of well-defined and controlled architecture PSI-based star polymers, demonstrate controlled release at elevated pH, and describe a novel method to evaluate the potential toxicity of polymers in plants. As opposed to most other methods for PSI synthesis, our approach yields polymers with controlled molecular weights via a chain-growth process. We describe a novel method to prepare an amphiphilic star polypeptide, poly (aspartic acid-co-succinimide) (PASP-co-PSI), through ring-opening polymerization[12] of a protected α-amino acid N-carboxyanhydride (NCA) and subsequent deprotection and post-polymerization modification to yield controlled molecular weight PSI-based copolymers. PSI is relatively hydrophobic, but it is readily hydrolyzed to hydrophilic polyaspartate (PASPA) at elevated pH. Therefore, we hypothesize that these polymers may respond to the alkaline nature of the phloem and may be used to construct an eventual pH-responsive delivery system in agriculture. Additionally, biodegradation to innocuous byproducts, a reported benefit of PASP and PSI,[13] is another important consideration when designing materials for agricultural delivery. We believe PASP-co-PSI copolymers may be used to prepare promising nanomaterials for agricultural applications, especially in addition to the establishment of a method to evaluate its potential toxicity in plant tissue.

Compared to linear polymers, star-shape polymers with three-dimensional globular structures have been widely investigated due to their unique properties, such as compact structures, and lower viscosities compared to their linear analogs,[14] which may facilitate their transportation within vasculature in controlled delivery systems.[15] The synthetic route for the preparation of star (poly(β-benzyl-L-aspartate)$_{43}$)$_3$ (PBLA$_{43}$)$_3$ is shown in FIG. 2.1. After polymerization of Asp(OBzl)-NCA with a trifunctional amine initiator, the resulting polymer (M$_n$=26,600 g/mol, M$_w$/M$_n$=1.2) was deprotected with HBr/CH$_3$COOH/ CF$_3$COOH to afford (PASP$_{43}$)$_3$ (FIG. 2.1).[16] Finally, the star-PASP was reacted with thionyl chloride to partially ring close the units of aspartic acid to yield the desired succinimide units. The presence of both aspartic acid and succinimide units led to the resultant copolymers being amphiphilic.[17] Complete synthetic and characterization details for PBLA, PASP, and PASP-co-PSI are given in ESI†.

The partial ring closure of PASP to PSI was confirmed by $^1$H NMR spectroscopy (FIG. 2.2) and IR spectroscopy (FIG. 2.3). The signals from the methylene units in PASP (NHCHCH$_2$) and in PSI (CCHCH$_2$C) are clearly visible at 4.6 and 5.4 ppm, respectively. Three different PASP-co-PSI copolymers were considered, for which integration of the PASP-co-PSI peaks corresponds to about 25% (PASP$_{32}$-co-PSI$_{11}$)$_3$, 40% (PASP$_{26}$-co-PSI$_{17}$)$_3$, and 60% (PASP$_{17}$-co-PSI$_{26}$)$_3$ of the units in each copolymer being in the ring-closed form (FIG. 2.4). The partial ring closure of PASP to PSI was additionally confirmed by FTIR spectroscopy. The stretching vibration of ν(C=O) of the carboxylic groups, in the amides of PASP was present at 1710, 1640 and 1533 cm$^{-1}$.[18] After ring-closing, the imide peak of PSI was clearly visible at 1796 cm$^{-1}$, as with the thermally prepared PSI, confirming the presence of succinimide rings within the PASP-co-PSI (FIGS. 2.3 and 2.5).

With amphiphilic PASP-co-PSI successfully synthesized, self-assembly into well-defined nanoparticles was investigated. Transmission electron microscope (TEM) offered evidence of PASP-co-PSI spherical nanoparticles with an average size of 30, 40, and 60 nm for (PASP$_{32}$-co-PSI$_{11}$)$_3$, (PASP$_{26}$-co-PSI$_{17}$)$_3$, and (PASP$_{17}$-co-PSI$_{26}$)$_3$, respectively (FIGS. 2.6A, 2.7A and FIG. 2.6B). Dynamic light scattering (DLS) analysis yielded Z-average hydrodynamic diameters of 75, 140, and 186 nm with a polydispersity index of 0.239, 0.127, and 0.163 (FIG. 2.7B), indicating rather narrow distributions of particle sizes. The difference in sizes observed by TEM and DLS is likely attributed to the dehydration of the copolymer nanoparticles upon desorption onto the TEM grid and the formation of aggregates in aqueous solution.[19] Control of size is important during nanoparticle-facilitated delivery to plants, as the cell wall prevents large particles from being passed through.[20] However, the particles in the size range observed here are expected to be promising for delivery in plants. For example, recently, Numata and coworkers first reported that peptide carriers can be used to deliver genes into plant cells, with a size of pDNA/peptide complexes below about 200 nm leading to good transfection efficiency.[21]

Naphthaleneacetic acid (NAA) is a synthetic plant hormone in the auxin family[22] and is involved in many processes of live plant activity, such as cell elongation, division, and response to external environmental variety.[23] NAA has limited solubility in water and excellent fluorescence and UV absorption properties,[24] making it useful as a model pesticide to provide insight into the potential utility of PASP-co-PSI copolymers for controlled release in plants. As shown in FIG. 2.8A, only minimal NAA release was observed for the PASP-co-PSI copolymer nanoparticles at neutral pH, suggesting the hydrophobic succinimide units are relatively stable under these conditions. On the other hand, when the pH was increased to 8.5 (i.e., near the pH of the phloem), NAA release was significantly accelerated. These results are consistent with the pH-dependent hydrolysis of the hydrophobic PSI units to yield hydrophilic PASP units and subsequent nanoparticle disassembly. To confirm this, (PASP$_{26}$-co-PSI$_{17}$)$_3$ was dissolved at pH=8.5 and allowed to age for 48 h. Afterwards, the resulting polymer was isolated by dialysis and lyophilization and subsequently characterized by NMR and FTIR spectroscopy. The results (FIGS. 2.8B-C) were consistent with hydrolysis of the succinimide units, as evidenced by these spectra being nearly identical to those of polyaspartate homopolymer.

While there are many established methods to evaluate the safety of polymeric materials in medicine, methods for toxicity evaluation in plant cells and tissues are much less developed. We developed a method based on plant tissue culture to evaluate the toxicity of polymers in plants.[6] Citrus seeds were planted on germination medium and were cultured in the dark at 25° C. for five weeks, causing the seedlings to become partially etiolated, or white, to reduce the potential interference of chlorophyll during subsequent fluorescence microscopy. The seedlings were cut into 1-2 cm fragments and placed on MSBC plates, which included specific concentrations of dissolved (PASP$_{26}$-co-PSI$_{17}$)$_3$. The seedlings were placed into a growth chamber with alternating light and dark (12 h each) for two weeks. The dead and living tissue segments were counted. As shown in FIG. 2.9A, almost all citrus segments survived, even at high concentrations (i.e., 240 µg/mL) of polymer, indicating $(PASP_{26}\text{-}co\text{-}PSI_{17})_3$ is relatively non-toxic to citrus plant tissue.

To further investigate the toxicity of $(PASP_{26}\text{-}co\text{-}PSI_{17})_3$, we utilized a dual color fluorescent staining system designed for simultaneous visualization of viable and non-viable plant cells.[25] Viable cells have intact plasma membranes and intracellular esterases with the ability to enzymatically hydrolyze a fluorescein diacetate probe. The resultant fluorescent hydrolyates are polar compounds that cannot cross the plasma membrane, which leads to green fluorescence within the cytoplasm. On the other hand, propidium iodide can enter non-viable cells due to their damaged membranes, which leads to bright red fluorescence upon intercalation with DNA within the nucleus. As shown in FIG. 2.9B, citrus leaves treated with $(PASP_{26}\text{-}co\text{-}PSI_{17})_3$ demonstrated the green color of fluorescein diacetate under blue light at 490 nm/525 nm Ex/Em (FITC), while showing no fluorescence under blue light at 570 nm/590 nm Ex/Em (Rho). Conversely, when dead citrus leaves were used as a positive control, very little green fluorescence from FITC was observed, while significant red fluorescence from the propidium iodide was clearly visible. These results offer further evidence that $(PASP_{26}\text{-}co\text{-}PSI_{17})_3$ is non-toxic at the concentrations considered.

Experimental Methods

Materials. L-Aspartic acid 4-benzyl ester and 1-naphthaleneacetic acid were purchased from Alfa Aesar. 2,4,6-triaminopyrimidine (97%) was purchased from Acros, and triphosgene was purchased from TCI America. Hydrogen bromide (33 wt % solution in glacial acetic acid) was obtained from Sigma-Adrich. Tetrahydrofuran (THF), n-hexane, dioxane, and ethyl ether were treated with calcium hydride and distilled prior to use. The benzyl adenine (BA), Murashige and Skoog basal salt mixture (MS salt), claforan (cefotaxime), myo-inositol, and plant cell viability assay kit were obtained from Sigma-Aldrich and used as received unless otherwise noted. All other materials were purchased from VWR or Fisher unless otherwise noted.

Methods. $^1$H NMR spectroscopy was performed using a Varian Mercury spectrometer (300 or 500 MHz) with deuterated dimethyl sulfoxide (DMSO-d$_6$) or D$_2$O as the solvents. Molecular weight and molecular weight distribution ($M_w/M_n$) were determined by size exclusion chromatography (SEC) in N,N-dimethylacetamide (DMAc) with 50 mM LiCl at 50° C. and a flow rate of 1.0 mL min$^{-1}$ (Agilent isocratic pump, degasser, and autosampler, columns: PLgel 5 m guard+two ViscoGel I-series G3078 mixed bed columns: molecular weight range 0-20×10$^3$ and 0-100×10$^4$ g mol-1). $M_{n,SEC}$ and Đ were determined by conventional PS calibration. IR spectra were collected using a Bruker Vertex 80v with a Pike GladiATR stage using the Opus 6.5 software package. Transmission electron microscopy (TEM) was recorded with a Hitachi H7000 microscope operating at 100 kV. A freshly glow discharged (Pelco easiGlow™, Ted Pella, Inc.) A Formvar coated 400-mesh nickel grid was placed on a 0.5 mg/mL drop of solution. The grid was dried at room temperature before investigation. Dynamic light scattering (DLS) analysis was conducted at 25° C. on a Zetasizer Nano-ZS (Malvern).

Synthesis of N-carboxyanhydride of f-benzyl L-aspartate. The synthesis of the N-carboxyanhydride of p-benzyl L-aspartate (Asp-NCA) was conducted as follows. A suspension of L-aspartic acid 4-benzyl ester (7.0 g, 31 mmol) in THE (200 mL) was heated to 40° C. in an argon atmosphere, and triphosgene (4.5 g, 15 mmol) was added. When the solution became transparent, the mixture was precipitated in anhydrous hexane. The crude product was further purified by recrystallization from a mixture of anhydrous n-hexane/THF (×3), and the remaining solvents were removed by vacuum at room temperature. Yield, 82%. $^1$H NMR (DMSO, 300 MHz): $\delta_H$ (ppm)=2.8-3.2 (m, —CH$_2$CHN), 4.69 (s, —CHN), 5.12 (s, CH$_2$Ar), 7.37 (s, Ar—H), 9.0 (s, NH).

Synthesis of poly(benzyl-L-ASP). 2,4,6-Triaminopyrimidine (132 mg, 1.02 mmol) was dissolved in anhydrous dioxane (150 mL) and stirred for 30 min. Asp-NCA (7.9 g, 32 mmol) (FIG. 2.10) dissolved in 50 mL anhydrous dioxane was added to the TAPM solution. The reaction mixture was stirred for 36 h at 30±5° C. and subsequently precipitated in diethyl ether to obtain poly(benzyl-L-ASP) (PBLA). $M_n$=2.6×10$^4$ g/mol, $M_w/M_n$=1.2. Yield, 90%. $^1$H NMR (DMSO, 300 MHz): $\delta_H$ (ppm)=2.5-2.9 (CHCH$_2$C), 4.6 (CHNH), 4.75 (CCHC), 5.1 (ArCH$_2$), 7.3 (ArH), 8.2 (NH, NH$_2$). The $^1$H NMR spectrum is shown in FIG. 2.11.

Deprotection of poly(benzyl-L-ASP). PBLA (2.0 g) was dissolved in trifluoroacetic acid (TFA, 20 mL), 8 equiv. HBr (33 wt % solution in glacial acetic acid) was added, and the mixture was stirred for 1-2 h. Diethyl ether was used to precipitate PASP, and the precipitate was dried under vacuum. Yield, 70%. $^1$H NMR (DMSO, 300 MHz): $\delta_H$ (ppm)=2.8 (CHCH$_2$C), 4.6 (CHCH$_2$C), 8.1 (NH). $^1$H NMR spectrum of PBLA is shown in FIG. 2.12 and the gel permeation chromatography trace for the PBLA precursor in FIG. 2.13.

Synthesis of PASP-co-PSI. Thionyl chloride (2.27 mL, 31.29 mmol or 4.55 mL, 62.58 mmol or 9.09 mL, 125.16 mmol) was dissolved in dichloromethane (DCM, 100 mL), and tPASP (1.2 g) was added separately. The solution was refluxed at 60° C. for 18 h. Rotary evaporation was used to remove the solvent. A mixture of DCM (100 mL) and pyridine (1.2 equiv.) was added and the resultant solution was refluxed at 60° C. for 18 h. The solvent was removed, and the product was dissolved in N,N-dimethylformamide (DMF) before being precipitated into diethyl ether to obtain $(PASP_{32}\text{-}co\text{-}PSI_{11})_3$, $(PASP_{26}\text{-}co\text{-}PSI_{17})_3$, and $(PASP_{17}\text{-}co\text{-}PSI_{26})_3$, were obtained. Yield, 70%, 67% and 62%. $^1$H NMR (DMSO, 300 MHz): $\delta_H$ (ppm)=2.8 (CHCH$_2$C), 4.6 (NHCHCH$_2$), 5.36 (CCHCH$_2$C), 8.15 (NH).

Self-assembly and characterization of PASP-co-PSI nanoparticles. $(PASP_{32}\text{-}co\text{-}PSI_{11})_3$, $(PASP_{26}\text{-}co\text{-}PSI_{17})_3$, and $(PASP_{17}\text{-}co\text{-}PSI_{26})_3$, were dissolved in DMSO (1 mL) separately and then dropped into DI water (10 mL) slowly under continuous stirring for 4 h. The PASP-co-PSI nanoparticle solutions were obtained for TEM and DLS measurement. The nanoparticle solutions were dropped onto nickel grids with air-drying at room temperature before investigation.

Encapsulation and release of 1-naphthaleneacetic acid from nanoparticles. For all copolymers, PASP-co-PSI (30 mg) and 1-naphthaleneacetic acid (NAA, 25 mg) were dissolved in DMSO (5 mL) with stirring, and then deionized (DI) water (15 mL) was added. After 5 h of continuous stirring, PASP-co-PSI, was assembled into NAA-loaded nanoparticles. The solution was transferred into a new dialysis bag (MWCO=3500 D) and dialyzed against DI water for 24 h to remove free NAA. The nanoparticle solution was withdrawn and transferred into new dialysis bags. These bags were soaked in phosphate buffered saline (PBS) at different pH (pH 7.0, 8.5) in beakers with continuous stirring. At predetermined time intervals, 5 mL of the external solution was removed and replenished with an equal volume of fresh PBS for analysis. The amount of released and total NAA was measured by UV spectroscopy at wavelength of 282 nm with a standard calibration curve of NAA. $^1$H NMR spectrum of PASP is shown in FIG. 2.14.

Hydrolysis of PASP-co-PSL (PASP$_{26}$-co-PSI$_{17}$)$_3$ was chosen as a model to research the hydrolysis of PASP-co-PSI. (PASP$_{26}$-co-PSI$_{17}$)$_3$, was dissolved at pH=8.5 and stirred for 48 h. Afterwards, the resultant polymers was isolated by dialysis and lyophilization and subsequently characterized by NMR and FTIR spectroscopy. PASP was dissolved in NaHCO$_3$ solution and isolated by dialysis and lyophilization to obtain PASPA as a control spectrum for FTIR.

Preparation of germination medium. FM stock (1.87 g Na$_2$EDTA, 1.39 g FeSO$_4$·7H$_2$O into 500 mL DI water; 5.00 mL), myo-inositol (50.00 mg), MS salts (2.15 g), and sucrose (15.00 g) were added to a sterile beaker. A 10 N NaOH solution was added to bring the pH to 5.7, and the volume was adjusted to 1.00 L. Agar (7.00 g) was added to the medium and melted for 30 min to obtain the final germination medium.

Preparation of citrus seeds. Germination medium (12 mL) was added into sterile glass culture tubes. Healthy, viable citrus seeds from grapefruit (*Citrus paradise* Macf. cv Duncan) and sweet orange (*Citrus sinensis* (L.) Osb. cv Pineapple) were selected, and the seed coats were removed. The seed kernels were kept moist at all times. Seeds were placed in an autoclaved beaker equipped with a stir bar and stirred in 300 mL of the following solutions for the predetermined time intervals: 70% ethanol (2 min), 10% NaClO (10 min), and sterile DI water rinses 3 times (2 min).

Culture of citrus seeds. One seed was placed into each germination medium-filled culture tube and the tubes were placed in racks. The racks were wrapped with plastic wrap and doubly wrapped with aluminum foil in order to minimize light exposure. Finally, the enclosed test tube racks with seeds were put on the bottom shelf of a growth chamber for 35 days, when the etiolated seedlings were used for toxicity screening.

Preparation of the MSBC medium. GM stock (20 mg Glycine, 50 mg Nicotinic Acid, 100 mg Pyridoxine HCl, 100 mg Thiamine HCl into 500 mL; 10 mL), MS salts (4.30 g), sucrose (30.00 g), myo-inositol (100 mg), and BA (2 mg) were dissolved in DI water. After adjusting the pH to 5.7, additional DI water was added to bring the volume to 1.00 L. Agar (8.00 g) was added, and the solution was autoclaved for 25 min. After cooling, 1 mL of filtered and sterilized (500 g/L) Claforan stock was added to obtain 500 mg/L MSBC medium. The medium was transferred into sterilized culture dishes, and different concentrations of (PASP$_{26}$-co-PSI$_{17}$)$_3$ were added before solidification, and poly(L-aspartic acid)$_{50}$-block-poly(L-leucine)$_{50}$-block-poly(L-lysine)$_{50}$ was used as control with a final concentration of 242 µg/mL.

Toxicity assessment by tissue culture. 1-2 cm segments of etiolated citrus plants were placed on MSBC medium-filled culture dish with their respective treatments. These dishes were then transferred into a growth chamber with 12 h of alternating light and dark for 2 weeks, which together with the media induce shoot regeneration and chlorophyll production. Living (green) and dead (white) segments were counted after predetermined times.

Toxicity assessment by dual color fluorescent staining system. Citrus leaves were used to evaluate toxicity according to the protocol of the Plant Cell Viability Assay Kit (Sigma) without modification (FIGS. 2.15A-I). Citrus leaves were incubated in 1 mg/mL (PASP$_{26}$-co-PSI$_{17}$)$_3$ solution for 1 h at room temperature. Samples were rinsed (×3) and then incubated with staining solution for 2 min. Dead citrus leaves were used as a negative control.

In conclusion, compared to traditional methods involving the thermal condensation polymerization of aspartic acid to PSI and its subsequent partial hydrolysis to PASPA to produce amphiphilic polysuccinimide copolymers, a novel method using NCA ring-opening polymerization was employed. The star polymer product, PBLA, was produced with a controllable molecular weight and a narrow molecular weight distribution. After deprotection, the resultant polypeptides were converted to PSI-containing copolymers by partial ring closing of the aspartic acid units. The resultant amphiphilic star copolymers self-assembled into aggregates with the ability to incapsulate NAA, a common plant hormone, and showed rapid release at an increased pH, similar to conditions present in the phloem of plants. Furthermore, a novel method to assess the toxicity of polymers in plant cells and tissues was established. Because plant cells can not be reliably cultured, plant tissue culture and a dual color fluorescent staining system were utilized to evaluate the toxicity of amphiphilic polypeptide. The results showed limited toxicity of the synthesized polymers to plant tissue. Although the utility of controlled delivery systems has been widely proposed for the treatment of human diseases with the goal of reducing side effects and improving availability of the delivered drugs, similar delivery systems for pesticides and nutrients to plants have received much less attention. However, given the current low use efficiency of fertilizers and pesticides, modern agriculture could greatly benefit from a site-specific delivery system to reach targeted sites and reduce potential pollution caused by undelivered components. We believe this work has significant potential for phloem-limited release, and given the biodegradability and minimal toxicity of these polymers to plant tissue and cells, other potential applications in agriculture can be envisioned.

REFERENCES, EXAMPLE 2

1 J. R. McDaniel, D. J. Callahan, and A. Chilkoti. *Adv. Drug. Deliver. Rev.,* 2010, 62, 1456.
2 N. P. Gabrielson, H. Lu, L. Yin, D. Li, F. Wang, and J. Cheng. *Angew. Chem. Int. Ed.,* 2012, 51, 1143.
3 T. J. Deming. *Progress in Polymer Science,* 2007, 32, 858.
4 (a) T. Nakato, M. Yoshitake, K. Matsubara and M. Tomida. *Macromolecules,* 1998, 31, 2107. (b) A. J. Adler, G. D. Fasman, and E. R. Blout. *J. Am. Chem. Soc.,* 1963, 85, 90. (c) H. Yang, C. W. Park, M. Woo, M. Kim, Y. M. Jo, H. G. Park, and J. Kim. H. *Biomacromolecules,* 2010, 11, 2866.
5 (a) H. S. Kang, S. R. Y. J. Kim, S. Han, and I. Chang. *Langmuir,* 2001, 17, 7501. (b) M. Tomida, T. Nakato and M. Kuramochi. 1996, *Polvmer,* 37, 4435.
6 M. R. Hill, E. J. MacKrell, C. P. Forsthoefel, S. P. Jensen, M. Chen, G. A. Moore, Z. L. He, B. S. Sumerlin. *Biomacromolecules,* 2015, DOI: 10.1021/acs.biomac.5b00069
7 R. Darad, A. K. De, and A. S. Aiyar. *Toxicol. Lett.,* 1983, 17, 125.
8 (a) M. Xiong, Y. Bao, X. Du, Z. Tan, Q. Jiang, H. Wang, Y. Zhu, and J. Wang. *ACS Nano,* 2013, 7, 10636. (b) J. Zhang, Z. Yuan, Y. Wang, W. Chen, G. Luo, S. Cheng, R. Zhuo, and X. Zhang. *J. Am. Chem. Soc.,* 2013, 135, 5068. (c) R. L. Manthe, S. P. Foy, N. Krishnamurthy, B. Sharma, and V. Labhasetwar. *Mol. Pharm.,* 2010, 7, 1880. (d) C. L. Weaver, J. M. LaRosa, X. Luo, and X. T. Cui. *ACS Nano,* 2014, 8, 1834. (e) C. G. Lux, S. Joshi-Barr, T. Nguyen, E.

Mahmoud, E. Schopf, N. Fomina, and A. Almutairi. *J. Am. Chem. Soc.*, 2012, 134, 15758.

9 (a) D. Vreugdenh, and E. A. M. K. Gronsveld. *Physiol. Plantarum*, 1989, 77, 385. (b) A. J. E. van Bel and P. H. Hess. *J. Exp. Bot.*, 2008, 59, 261. (c) B. J. Atwell, P. E. Kriedemann, and C. G. N. 1999, *Macmillan Education Australia.*

10 (a) V. C. Baligar, N. K. Fageria and Z. L. He. *Commun. Soil Sci. Plant*, 2001, 32, 921. (b) W. R. Raun, and G. V. Johnson. *Agron. J.*, 1999, 91, 357. (c) J. E. Fox, J. Gulledge, E. Engelhaupt, M. E. Burow, and J. A. McLachlan. *PNAS*, 2007, 104, 10282.

11 D. Tarn, C. E. Ashley, M. Xue, E. C. Carnes, J. I. Zink, and C. J. Brinker. *Acc. Chem. Res.*, 2013, 46, 792. (b) H. Chen, M. F. Neerman, A. R. Parrish, and E. E. Simanek. *J. Am. Chem. Soc.*, 2004, 126, 10044. (c) Y. Hoshino, H. Koide, K. Furuya, W. W. H. III, S. Lee, T. Kodama, H. Kanazawa, N. Oku, and K. J. Shea. *PNAS*, 2012, 109, 33.

12 (a) T. J. Deming, *Prog. Polym. Sci.*, 2007, 32, 858-875. (b) T. J. Deming, *Nature*, 1997, 390, 386-389. (c) J. Cheng and T. Deming, *Top. Curr. Chem.*, 2012, 310, 1-26. (d) H. Lu, J. Wang, Z. Song, L. Yin, Y. Zhang, H. Tang, C. Tu, Y. Lin, J. Cheng, *Chem. Commun.*, 2014, 50, 139-155.

13 (a) S. K. Wok, G. Swift, Y. H. Paik, K. M. Yocom, R. L. Smith, and E. S. Simon. *Macromolecules*, 1994, 27, 7613. (b) R. Kausik, A. Srivastava, P. A. Korevaar, G. Stucky, J. H. Waite, and S. Han. *Macromolecules*, 2009, 42, 7404.

14 (a) A. Blencowe, J. F. Tan, T. K. Goh, and G. G. Qiao. *Polymer*, 2009, 50, 5. (b) G. Lapienis. *Prog. Polym. Sci.*, 2009, 34, 852.

15 (a) H. Y. Cho, S. E. Averick, E. Paredes, K. Wegner, A. Averick, S. Jurga, S. R. Das and K. Matyjaszewski. *Biomacromolecules*, 2013, 14, 1262. (b) J. Liu, H. Duong, M. R. Whittaker, T. P. Davis, C. Boyer. *Macromol. Rapid Commun.*, 2012, 33, 760-766.

16 (a) H. R. Kricheldorf *Angew. Chem. Int. Ed.* 2006, 45, 5752. (b) J. Cheng and T. J. Deming. *Top. Curr. Chem.*, 2012, 310, 1. (c) J. Wang, H. Lu, R. Kamat, S. V. Pingali, V. S. Urban, J. Cheng, and Y. Lin. *J. Am. Chem. Soc.*, 2011, 133, 12906.

17 (a) M. M. Lenman, A. Lewis and D. Gani. *J. Chem. Soc. Perk. T.* 1, 1997, 2297. (b) S. Han and Y. Kim. *Tetrahedron*, 2004, 60, 2447.

18 B. Sun, W. Li and P. Wu. *Polymer*, 2008, 49, 2704.

19 Y. Huang, Z. Tang, X. Zhang, H. Yu, H. Sun, X. Pang and X. Chen, *Biomacromolecules*, 2013, 14, 2023.

20 P. González-melendi, R. Fernández-pacheco, M. J. Coronado, E. Corredor, P. S. Testillano, M. C. Risueño, C. Marquina, M. R. Ibarra, D. Rubiales and A. Pèrez-deluque. *Ann. Bot.-London*, 2008, 101, 187.

21 M. Lakshmanan, Y. Kodama, T. Yoshizumi, K. Sudesh, and K. Numata. *Biomacromolecules*, 2013, 14, 10.

22 M. Flasiński and K. Hąc-Wydro. *Environ. Res.*, 2014, 133, 123.

23 D. A. Gómez, R. O. Carpena. *J. Plant Physiol.*, 2014, 171, 1354.

24 (a) H. A. Moye, T. A. Wheaton. *J. Agr. Food Chem.*, 1979, 27, 291. (b) X. Guo, Y. Zhou, F. Tu, X. Xiong, H. Wang and H. Zhang. *J. Sep. Sci.*, 2011, 34, 789.

25 (a) H. Koyama, T. Toda, and T. Hara. *J. Exp. Bot.*, 2001, 52, 361. (b) S. M. Regan, and B. A. Moffatt. *Plant Cell*, 1990, 2, 877.

Example 3

For the successful internalization of nanocarriers to the Huanglongbing (HLB) infected plants, the particle sizes would be critical and their size would be approximately 30 nm or less. To prepare the uniform and functional (drug loaded) nanoparticles, two approached were applied: nanoprecipitation of functional linear polymers and synthesis of functional polymeric architecture such as star polymers.

Star polymers were prepared by a core-first procedure, i.e., multifunctional macroinitiators (MIs) were prepared and consequently chain-extension reactions were carried out from the MIs. Using the core-first method combined with controlled polymerization technique, star polymers with predetermined molecular weights (MWs) and number of arms ($N_{arm}$) could be obtained. In general, plants do not have a well-developed excretion system than those of animals, amino acids based polypeptides would have more advantages for the plants—polypeptides can be easily degraded than those of commodity polymers and non- or less-cytotoxicity would be expected.

Star polymers of lysine (Lys) based MIs and arms with aspartic acid (Asp). FIG. 3.1 (Scheme 1) demonstrates overall reaction steps. For the preparation of the star polymers, two N-carboxyanhydrides (NCA) monomers were mainly used—NCA carboxybenzyl-lysine (NCA Z-Lys) and NCA carboxybenzyl-aspartic acid (NCA Z-Asp). NCA monomers can be polymerized in presence of (primary) amine (FIG. 3.2 (Scheme 2)) by ring-opening polymerization (ROP). Star polymers can be obtained by ROP of NCA Z-Asp (chain extension reaction), initiated by primary amines from the side chains of the PLys (MIs).

To control the size of the polymers, preliminary studies were carried out—Three PLys MIs were prepared and their degrees of polymerizations (DPs) were 22, 40, and 65. MWs and protected groups (before/after deprotection of carboxybenzyl (Z) groups) were monitored by gel permeation chromatography (GPC) and nuclear magnetic resonance spectroscopy (NMR). FIG. 3.3 shows an example of PLys characterization. GPC (FIG. 3.4) analysis shows uniform molecular weight distribution (~1.07, MWD=$M_w/M_n$) and $^1$H NMR analysis clearly reveals deprotection of the Z groups (FIG. 3.3C), indicating recovered primary amines at the side chains. Subsequently, star polymers were synthesized by chain extensions of NCA Z-Asp from PLys MIs. To control the polymer sizes, different target DP of side chains were designed. Table 1 summarizes the results of the star polymers. Previously, we obtained pH responsive smart nanocarriers by partially ring closure of PAsp (FIG. 3.5) and successfully loaded model compounds. We would anticipate our novel star polymers would have amphiphilic behavior due to their hydrophilic (Asp) and hydrophobic (succinimide (SI)) segments and used for smart drug delivery carriers.

TABLE 1

Summary of preliminary studies of star polymers.

| Entry | $DP_{Lys}$ | $M_{n, Backbone}$ | $M_{n, Star}$ | MWD | $DP_{Asp}$* |
|---|---|---|---|---|---|
| 1 | 22 | 2820 | 268800 | 1.52 | 36 |
| 2 | 40 | 5130 | 443500 | 1.04 | 42 |
| 3 | 65 | 8330 | 2603000 | 1.42 | 195 |

*Determined by GPC with multi angle laser light scattering detector.
$M_n$ = number-average molecular weight (g/mol)

Detail control drug release will be studied based on the different hydrophilicity (i.e., ratio of [PAsp]/[PSI]) or the level of functionalized groups (e.g., boronic acids (BAs)). Additionally, chain extension of $3^{rd}$ NCA monomers will be conducted for adjusting hydrophilicity, if needed (FIG. 3.6 (Scheme 3) B). Scheme 3 proposes control drug release under the environmental changes. Two drugs, penicillin G or brassinosteroids, will be used for HLB treatment. The driving force for encapsulation of penicillin G to the nanocarrier is their hydrophobicity (water solubility~210 mg/L). Another drug compound, brassinosteroids, will be encapsulated in BA modified star polymers by complexation between BA and diols from the brassinosteroids. Under pH changes (higher pH in phloem, ~8.5), drug molecules will be successfully released from the nanocarriers. Since the polymers include of polypeptides, slow decomposition of the nanocarriers in the plants will be expected. Such decomposition of the polymers would help excretion of remained chemical compounds and would anticipate minimizing (or suppressing) potential risks from chemical residues.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A composition comprising:
   a particle comprising a star polymer and an agent, wherein the star polymer is polysuccinimide-hexyl amine (PSI-HA), wherein the star polymer has a core and 3 to 50 arms extending from the core, wherein the core is a responsive unit and the arms are a hydrophilic unit, wherein the particle is not agglomerated, and wherein the polymer particle has a diameter of about 10 to 50 nm, wherein the particle has the chemical characteristic where under a first condition is amphiphilic and the agent is encapsulated by the star polymer, wherein the particle has the chemical characteristic where under a second condition is hydrophilic and the agent is not encapsulated by the star polymer, wherein the responsive unit is responsive to: a change in the pH environment around the polymer particle from a pH of about 6-6.5 to a pH of about 7-8.5 changes the particle from hydrophobic to hydrophilic; a change in the sugar level around the polymer particle from about 1 mM to about 10 mM or more changes the polymer particle from hydrophobic to hydrophilic; or a combination thereof.

2. The composition of claim 1, wherein the polymer particle has a diameter of about 10 to 30 nm.

3. A composition comprising:
   a particle comprising a star polymer and an agent, wherein the star polymer is polysuccinimide-hexyl amine (PSI-HA), wherein the star polymer has a core and 3 to 50 arms extending from the core, wherein the core is a responsive unit and the arms are a hydrophilic unit, wherein the particle is not agglomerated, and wherein the polymer particle has a diameter of about 10 to 50 nm, wherein the particle is amphiphilic and the agent is encapsulated by the star polymer.

4. The composition of claim 3, wherein the polymer particle has a diameter of about 10 to 30 nm.

* * * * *